COMMUNICATIONS NETWORK CONTROL SYSTEM

Filed Nov. 18, 1964 9 Sheets-Sheet 1

INVENTORS: K. D. HOPPER
E. E. SCHWENZFEGER
BY
S E Hollander
ATTORNEY

July 23, 1968 K. D. HOPPER ET AL 3,394,231

COMMUNICATIONS NETWORK CONTROL SYSTEM

Filed Nov. 18, 1964 9 Sheets-Sheet 3

United States Patent Office 3,394,231
Patented July 23, 1968

3,394,231
COMMUNICATIONS NETWORK CONTROL SYSTEM

Kenneth D. Hopper, Holmdel, and Edward E. Schwenzfeger, Atlantic Highlands, N.J., assignors to Bell Telephone Laboratories, Incorporated, New York, N.Y., a corporation of New York Filed Nov. 18, 1964, Ser. No. 412,048
13 Claims. (Cl. 179—18)

ABSTRACT OF THE DISCLOSURE

A communications network is disclosed wherein a limited amount of traffic can be routed via remote areas to relieve a designated route when the designated route becomes congested. Traffic sensing devices monitor the traffic capacities of the designated route and the switching and trunking facilities in the remote area. If the designated route becomes congested and the remote facilities can accept additional traffic, the remote facilities are automatically made available for traffic overflowing from the designated route until the designated route becomes free or until the remote facilities are required for their normal traffic usage.

This invention relates to switching networks and more particularly to arrangements for managing traffic in such networks.

More specifically, this invention relates to communication networks wherein mechanisms are employed for improving the efficiency of completing connections over the network.

In a very particular aspect this invention is concerned with telephone switching networks served by a plurality of interconnected switching centers wherein calls are normally directed over a limited number of designated routes and wherein instrumentalities are effective when the designated routes become congested for directing selective portions of the calls over special remote facilities without adversely affecting traffic normal to the remote facilites.

Typically, a large nationwide telephone switching network is made up of smaller switching networks or regions. Each region is served by a plurality of switching centers called control switching points for establishing connections between local offices within a region and between different regions. The control switching points are classified in their ascending order as toll centers which may serve one or more local offices in a toll center area; primary outlets which in addition to serving as toll centers also serve as switching points for calls to and from other toll centers in their areas; sectional centers which generally serve as switching points for calls to and from toll centers and primary outlets homed thereon; and regional centers which, in addition to serving as toll centers for local offices, primarily serve as switching points for calls to and from toll centers, primary outlets, sectional centers and other regional centers.

The control switching points and local offices are interconnected over a vast network of trunks, and each switching center comprises control equipment for establishing connections to these trunks. A call between two local offices is established by serially linking together a plurality of adjacent control switching points over trunks in the appropriate trunk route between two local offices. More specifically, the calling customer transmits to his local office the telephone number of the called customer. At the local calling office, control equipment is actuated to select a trunk in the most direct route to the called customer, and when an idle trunk has been selected the called telephone number is forwarded over that trunk to the first control switching point in the route. The control equipment at the first control switching point makes a similar trunk selection and extends the call over a trunk to the next adjacent switching point. This procedure continues until the last trunk connection to the local office of the called customer has been established.

Advantageously, each control switching point is coupled by groups of trunks to many other switching points, and the control equipment at each switching point is programmed to select trunks to the called office from the various trunk groups in a predetermined manner. For example, the control equipment will first attempt to select a trunk via the most direct route to the called office, and if the direct route trunks are unavailable, the control equipment will then attempt to select idle trunks from the first choice, second choice, etc. alternate routes until all of the available routes have been tested.

Generally, communication networks, such as the one being described, are equipped to furnish the best possible customer service during the normal busy-hour traffic loads. These networks, however, are occasionally subjected to traffic loads which exceed the normal design capacity of the network. While these overloads may occur in small areas of the network, and thus affect customer service therein, congestion in one area of the network often adversely affects service in many other areas.

Traffic overloads which cause network congestion are sometimes sporadic and unpredictable since they occur as the result of unforeseeable events such as earthquakes, floods, and other similar situations.

On the other hand, certain heavy traffic loads can, to a degree, be anticipated since they occur at predictable times. For example, it is well known that certain areas of a network experience excessive traffic surges during particular seasons of the year due to the increased activity and influx of customers to that area during its busy season.

Although it is not practical to provide network facilities to care for all possible traffic conditions, certain expedients can be utilized to minimize the effects of foreseeable overloads which may occur frequently or over extended intervals of time.

More specifically, additional network facilities might be furnished in a particular area on a temporary basis during the season when heavy traffic loads are anticipated in this area. Naturally, these facilities would be purposely mobile to facilitate their relocation to other areas of the network according to the changes in traffic requirements.

While the provision of temporary facilities helps alleviate the problems of traffic overload which occur over extended intervals, it is both impractical and uneconomical to install additional network facilities to handle those overload surges which exist in small areas of the network for relatively short periods of time. This is readily apparent when it is realized that although one section of the network may be congested due to a temporary heavy traffic situation, other portions of the network may be experiencing very little traffic and, therefore, have a surplus of idle switching and trunking facilities.

It is therefore one object of this invention to increase the utilization of existing network facilities to minimize the effects of traffic overloads.

Although alternate routing increases the efficiency of a communication network by distributing traffic over indirect routes when direct routes become congested, present alternate routing methods offer certain disadvantages.

For example, with present alternate routing arrangements the control equipment at a particular switching center tests only the trunk groups which originate at that center, and these trunk groups are generally tested in a predetermined sequence. A call is disposed of by routing it over the first available trunk in a route regardless of the traffic conditions that might be encountered in attempting to extend this connection through other control switching points in the route selected to the called customer.

More specifically, suppose there are five switching offices designated A, B, C, D, and E in a network, and a call is to be extended from office A to office E. At office A the direct trunk group A–E (between office A and office E) would be tested first, and if no idle trunks are available the call might be routed via office B over the first choice alternate route comprising trunk groups A–B and B–E, or the second choice alternate route via offices C and D comprising trunk groups A–C, C–D and D–E. Of course, either of the alternate routes will be selected only on the basis of the idle trunks in the first link of each route, that is, trunk group A–B for the first choice alternate route, and A–C for the second choice alternate route, and the control equipment at office A is unaware of the availability of network facilities in the remainder of these alternate routes. On this basis, if the direct trunks are busy and a trunk is available in trunk group A–B, the call will be routed over the first choice alternate route even though office B may be congested or the trunk group B–C from office B to office C is unavailable. While the hypothetical call from office A to office E may subsequently be blocked through the use of the first choice alternate route, a second choice alternate route although containing idle facilities will never be used as long as an idle trunk exists in the first link (A–B) of the first choice alternate trunk group.

It is therefore another object of this invention to provide means for evaluating the network beyond the first links in alternate routes before directing the traffic over these alternate routes.

It is also an object of this invention to furnish means for altering the order of selection of alternate routes at the control switching points in accordance with the traffic capabilities of these routes.

Heretofore, the alternate routing of calls between any two areas of the network was confined to a limited number of choices over certain designated routes. It can readily be appreciated that if an unlimited number of choices were available, a few calls in making repeated attempts to seek an idle route might hold common control equipment busy for prolonged periods and thus affect the overall network efficiency.

In addition, the switching and trunking facilities that provide alternate routes between two points in the network are generally used for direct routes for calls between other points in the network. These facilities must be designed to accept a certain amount of alternately routed traffic overflowing from the other routes without degrading the service normally routed through these facilities on a direct basis. It can readily be seen that if an excessive number of calls were alternately routed via a certain nearby area, the calls normally routed through that area would be displaced and forced to seek their alternate routes thus displacing other calls in a similar manner. Of course, if this condition were to continue uncontrolled the obvious result would be that a few calls would be routed over their direct routes, and most calls would be routed over their longer alternate routes.

Thus, for the above and other reasons conventional routing is generally limited to a direct route plus a few alternate routes which direct calls via nearby switching areas.

On the other hand, switching networks sometimes serve communities having different areas of interest, and it is advantageous to utilize these differences to improve the overall service for all communities.

For example, a particular switching network may have a high concentration of business establishments in one portion of the network and a residential area served by another portion. Generally, the communications facility serving the business community reaches its peak busy-period during the morning when most of the commercial establishments are beginning their normal business activities. In contrast, the facility serving the residential area might be relatively idle during the normal business day and not reach its busy-period until the early evening. It would seem desirable to have the network facilities interrelated in such a manner so that most of the facilities could be made available for that portion of the network currently offering the most traffic.

In addition to the variance due to the local calling habits of customers, large networks are sometimes affected by localized busy-periods due to the time differentials which exist between various communities served by different portions of the network.

As exemplified in a hypothetical network serving the United States, the United States is divided into four time zones, each zone to the west observing a standard time one hour earlier than its adjacent zone to the east. With a two- or three-hour time differential between certain communities, the peak busy hours for different parts of the network are in staggered relationship. A city in the Eastern time zone such a New York may reach its peak busy hour between 9 and 10 a.m. New York (Eastern standard) time, while communities such as Los Angeles in the Pacific time zone have not yet begun their business day since it is only 6 a.m. Pacific standard time.

Normally, it would be uneconomical to route traffic between two points in the Eastern time zone via remote facilities such as Los Angeles, yet at certain times these remote facilities are not being used to serve their normal traffic and could serve as alternate routes for traffic normal to the Eastern time zone. Of course, if such remote facilities were temporarily "borrowed" they would have to be returned to their normal use when the traffic normal to these facilities begins to increase as the peak busy-hour was reached in these time zones.

It is therefore a further object of this invention to improve service in a switching network by permitting facilities remote from one portion of the network to serve that portion of the network without adversely affecting the traffic normal to the remote facilities.

Many systems effect alternate routing of traffic in such a manner that when the direct route is busy between two points all traffic between those points is directed via the alternate routes. The first choice alternate route must then accept all traffic overflowing from the direct route until the first choice alternate route becomes congested and all its excess traffic is then directed to the second choice alternate route. In these arrangements where all traffic is handled in the same manner the alternate routes may easily become congested due to traffic overflowing from one route between two points, while traffic between other points is unable to gain access to these alternate routes.

It is still another object of this invention to selectively alter the quantity of traffic being offered to various routes.

In accordance with one specific illustrative embodiment of this invention a nationwide telephone switching network is made up of smaller networks or regions, each served by a plurality of control switching points. For reference purposes the regional centers serving certain of these regions have been designated as New York, Atlanta, Chicago, Denver, and Los Angeles.

The New York and Atlanta regional centers are both located in the Eastern time zone, while Chicago, Denver, and Los Angeles are located in the Central, Mountain and Pacific time zones, respectively.

Each regional center serves many local offices which in turn serve the telephone customers in the many communities in a given region. These local offices might be designated as Buffalo, N.Y.; Miami, Fla.; Salt Lake City, Utah, etc. In addition, there may be other control switching points such as toll centers, primary outlets, and sectional centers, such as the sectional center deignated herein a Jacksonville, Fla.

It is to be understood of course, that the use of specific geographic designations for the various switching centers is employed herein solely as an aid to the reader in appreciating the scope of the problem solved by this invention, and it is in no sense to be considered as limiting or necessary. In fact, these may be considered as arbitrary designations employed herein merely for convenience.

The various switching centers are interconnected by a network of trunks, and calls between any two points in a network can be directed over various routes. For example, calls originating at Buffalo, N.Y. and destined for Miami, Fla. might be routed over trunks to the New York regional center and then over a direct group of trunks between the New York regional center and the Miami local office. If the direct trunk group between the New York regional center and Miami is congested or out of service, the switching equipment at the New York regional center might "route advance" to select the first choice alternate route. The first choice alternate route between New York and Miami might comprise a trunk group between the New York regional center and the Jacksonville sectional center and a trunk group between Jacksonville and Miami. If the first choice alternate route out of New York is busy because no idle trunks are available between New York and Jacksonville, the control equipment at the New York regional center would again "route advance" and attempt to seek an idle trunk in the final route between New York and Miami. This final route might comprise a group of trunks between the New York regional center and the Atlanta regional center and a trunk group from Atlanta to Miami. If no idle trunks are available in the direct route, the first choice alternate route (via Jacksonville) or the final route (via Atlanta), the call originating in New York will be directed to an overflow trunk or to a delay quotation operator trunk where the operator will inform the calling subscriber of the possible delay in obtaining an idle circuit to Miami.

Of course, during the nonbusy hours, calls originating in New York would be completed over the most direct route. However, as the peak busy-hour approaches more and more calls are routed over alternate routes, and if the amount of traffic exceeds the capacity of the available routes, some calls may not be completed at all.

Advantageously located at certain regional centers which are remote from the New York regional center are detecting devices to monitor the traffic conditions being experienced at these remote centers. As an example, there might be one device to monitor the traffic being experienced by the common control equipment at Denver, and another device to monitor the traffic load being experienced on a Denver to Atlanta trunk group. This Denver to Atlanta trunk group is normally used for calls originating in localities around Denver to be completed via the Atlanta regional center. These remotely located load detecting devices are coupled to the New York regional center over a signaling channel to inform the New York regional center of the traffic load on the Denver regional center switching equipment, and the traffic load on the Denver to Atlanta trunk group. The New York regional center also contains equipment for ascertaining the availability of trunks in the trunk groups between New York and Atlanta and New York and Denver.

The New York to Denver and the Denver to Atlanta trunk groups are normally unavailable for extending calls from New York to Atlanta. Routing New York calls via the remote Denver facilities to Atlanta would cause many network, switching and trunking facilities to be occupied, and in addition, might adversely affect traffic normally using these remote facilities.

It must be remembered however that time differentials and differences in calling habits result in different areas achieving their peak busy-period at different times. More specifically, while the New York to Atlanta route may be busy during the hour from 9 a.m. to 10 a.m. eastern standard time, the Denver switching office may be relatively idle, since most of the communities around Denver have not yet commenced their normal day. Similarly, the trunks from New York to Denver and the trunks from Denver to Atlanta may be relatively unoccupied.

Also located at the New York regional center and coupled to the signaling channel from Denver is an alternate routing control circuit. The alternate routing control circuit can be set to alter the choice of routes originating at New York for selective portions of the control equipment at the New York regional center. For example, if the alternate routing control circuit is arranged to alter traffic between the New York and Atlanta regional centers the circuit can be set so that when it is actuated, only some of the control equipment at New York will select an alternate trunk route via remote switching facilities while the remaining control equipment will select other facilities.

Instead of routing New York to Miami calls to overflow when all trunks in the direct, first choice alternate and final routes become busy, the calls can now be routed via a remote switching network in Denver. For example, if the final route between New York and Atlanta is busy, and if the New York to Denver and Denver to Atlanta trunk groups can serve additional traffic and, furthermore, if the Denver common control equipment can handle additional calls, then selective portions of the New York to Atlanta traffic will be rerouted via the indirect Denver route. Although extensive switching and trunking facilities will be made busy due to the rerouting of these calls via a remote section of the network, the facilities are presently not required for the traffic they normally serve in the Denver area.

Thus, a portion of the New York to Atlanta final route traffic will be rerouted via the remote facilities until the congestion in the New York to Atlanta route is relieved, or until the remote network facilities are needed for the traffic they normally serve.

These and other objects and features of the invention will become readily apparent from the following description made with reference to the drawing in which.

*General description*

The arrangement and operation of the various components in the illustrative embodiment of this invention will be described subsequently with reference to the detailed FIGS. 2–8. However, in order to first appreciate an overall understanding of the arrangement contemplated a brief and general description will first be given with reference to the block diagram of FIG. 1.

*Arrangement of components*

Figure 1:
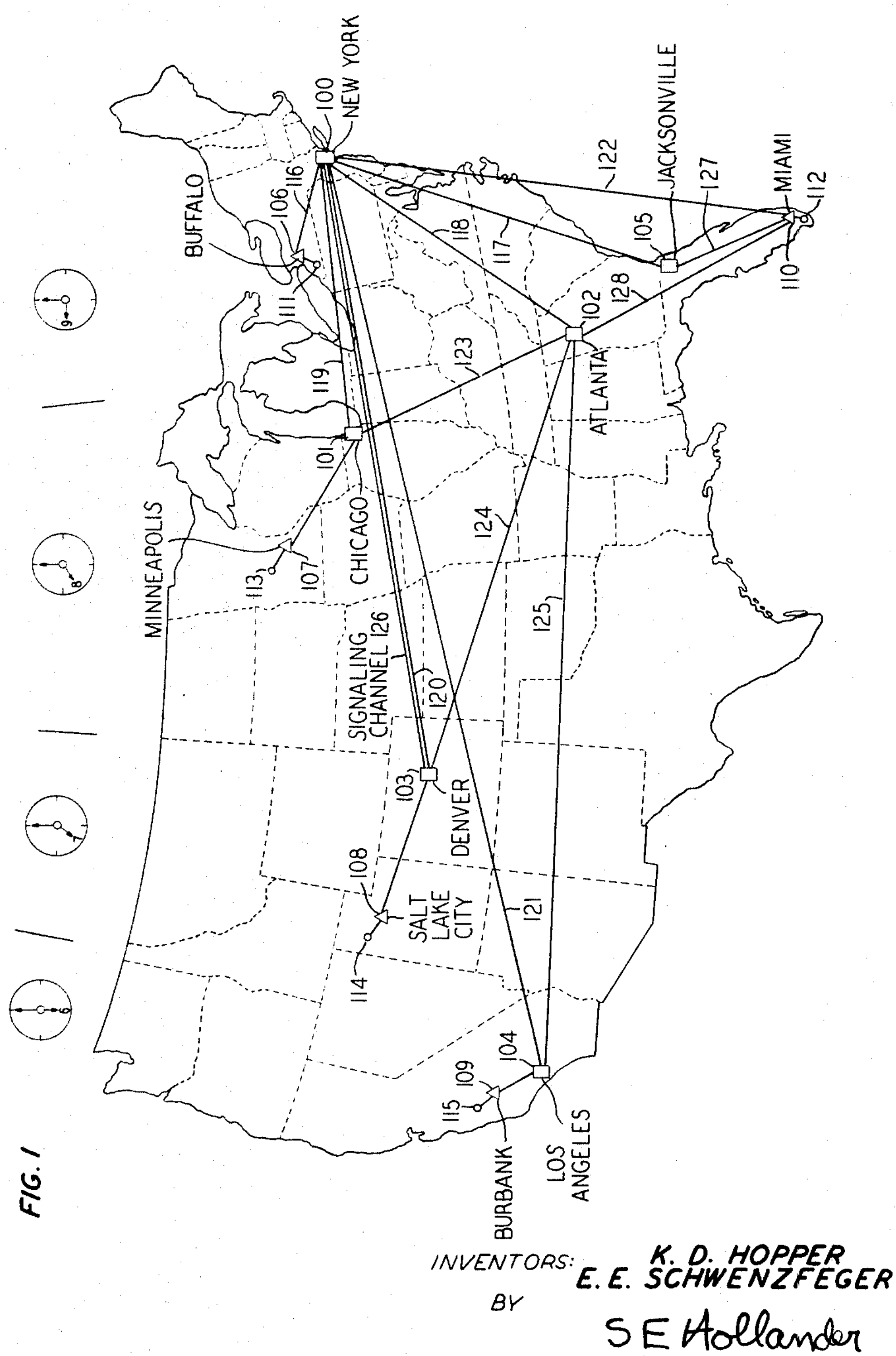
FIGS. 1 and 1A show a block diagram of the invention in combination with a telephone switching network.

Referring therefore to FIG. 1, there is shown a portion of a typical nationwide telephone network having six control switching points represented by the blocks 100–105 and designated New York, Chicago, Atlanta, Denver, Los Angeles, and Jacksonville, respectively. These control switching points serve calls between local offices in their areas and calls to and from other control switching points over a vast trunk network represented by the lines interconnecting the switching centers.

Connected to the various control switching points are local offices 106–110 designated Buffalo, Minneapolis, Salt Lake City, Burbank and Miami, respectively. To simplify the drawing only a few local offices have been shown, and it will be realized that these and many other local offices serve the telephone customers in the various communities throughout the network.

While each local office may be capable of serving thousands of telephone customers only one customer is shown connected to each local office, and these customers are represented by the circles designated 111–115.

The subscribers are connected to their local offices over subscriber lines in a well-known manner, and each local office is connected over trunks to its "home tandem," that is, the control switching point serving as an outlet to the rest of the network for those local offices within its area. For example, the Buffalo office 106 is connected to the New York regional center 100 over trunks in trunk group 116 which may comprise many trunks. It is over one of the trunks in trunk group 116 that calls are completed between Buffalo and other local offices served by the New York regional center or by the other control switching points in the network.

To complete calls between the New York regional center 100 and local offices in other areas of the network the New York regional center 100 is connected over trunk groups to the various control switching points in these areas. More specifically, trunk group 117 interconnects the New York regional center 100 with the Jacksonville sectional center 105, while trunk group 118 interconnects the New York regional center 100 with the Atlanta regional center 102. In a similar manner, the New York regional center 100 is connected to the Chicago, Denver, and Los Angeles regional centers over trunk groups 119, 120, and 121, respectively.

If the traffic between the New York area and a particular local office in a distant area warrants it, the New York regional center 100 may be connected over a direct trunk group to that distant local office. An example of this can be seen in FIG. 1 wherein the Miami local office 110 is directly connected over trunk group 122 to the New York regional center 100.

While only the trunk groups between the New York regional center 100 and other control switching points have been described, it will be realized that the other control switching points might be interconnected with each other over similar trunk groups. To simplify the drawing only the additional trunk groups 123, 124, and 125 have been shown, and these interconnect the Atlanta regional center 102 with the Chicago, Denver, and Los Angeles regional centers respectively.

Each of the control switching points comprises incoming and outgoing link frames upon which trunks to other switching centers are terminated and control equipment for establishing communication paths between the trunks. The control equipment is responsive to digital information received over a trunk incoming from a calling office and forwards the call over an idle outgoing trunk to the next switching center in the proper route to the called office. Before forwarding the call, the control equipment must first select the proper trunk group and then test for an idle trunk in that group. The selection of the proper trunk group is determined by the office designation of the called party, and the control equipment at each center is programmed to first select the most direct route to the called office, and if no trunks are available, to then select one or more of the alternate routes in a prescribed sequence until all available routes have been tested for idle trunks.

On a call from New York to Miami for example, the control equipment at the New York regional center 100 would first seek an idle trunk in trunk group 122 which goes directly to Miami, and if no trunks are available in this group, the control equipment would advance to first choice alternate route which comprises trunk group 117 via the sectional center at Jacksonville. Finally, if all trunks in trunk groups 122 and 117 are busy, the common control equipment at the New York regional center 100 would attempt to select an idle trunk in a final trunk group 118 which switches via the Atlanta regional center. If the trunks in trunk group 118 are all occupied, the call would be routed to a special tone or announcement trunk to inform the calling customer that circuits are temporaily unavailable to Miami.

Trunk groups 119, 120, and 121 which are connected to the New York regional center 100 are normally not used for completing calls between New York and Miami but are used for completing calls between the New York local offices and the local offices served by the Chicago, Denver, and Los Angeles regional centers, respectively. In a similar manner, the trunk groups 123, 124, and 125 between the Atlanta regional center and the Chicago, Denver, and Los Angeles regional centers are normally used for completing calls between local offices in these areas and not local offices served by the New York regional center 100.

It will also be noted from FIG. 1 that some of the regional centers serving such a vast network are located in different time zones. The New York and Atlanta regional centers are located in the Eastern time zone; Chicago is in the Central time zone; Denver observes Mountain standard time and Los Angeles observes Pacific standard time. As indicated by the clocks at the top of FIG. 1 each zone observes a time differing by one hour from the zone adjacent thereto. When it is 9 a.m. in New York it is only 8 a.m. in Chicago, 7 a.m. in Denver, and 6 a.m. in Los Angeles.

Due to the difference in calling habits of the various communities and also due to the time zone differentials, certain portions of the network may be experiencing heavy traffic during its peak busy-hour while a remote area may be handling very little traffic. While these conditions exist it is possible to utilize some of the network facilities normally serving the remote area to relieve traffic overloads in the congested area as long as the customer service in the remote area is not thereby adversely affected.

More specifically, if traffic conditions permit, it may be desirable to route New York to Miami traffic via the remote Denver portion of the network to relieve congestion in the network between New York and Miami.

To facilitate making remote network facilities available there are traffic load sensing devices located at the Denver regional center 103. These devices are coupled over signaling channel 126 to the New York regional center 100, and it is over this signaling channel that the load detectors can inform the New York regional center when the Denver switching equipment and the Denver to Atlanta trunk group 124 can handle additional traffic without denying service to the traffic normally served by these facilities. The function of these load sensing devices, which are better seen in FIG. 1A, will be further appreciated from the ensuing description with respect to typical calls completed over the network.

*Call from Buffalo to Miami via regular network facilities*

To illustrate the overall operation of the network a typical call from customer 111 at Buffalo to customer 112 in Miami via the normal network facilities will now be described with respect to FIG. 1A.

Customer 111, wishing to call customer 112 in Miami, lifts the telephone receiver and using his dial or a key set transmits to the Buffalo local office 106 the telephone number assigned to customer 112 in Miami. Since this call is outside of the New York local area, customer 111 would dial ten digits such as 305–CH3–1000 wherein the first three digits represent the area code for Miami, the next three digits represent the office code for a local office 110 and the last four digits represent the telephone number of customer 112.

The local office 106 responds to the information received from the calling customer and recognizes that the call is to a number outside of the local area. The control equipment at Buffalo then selects an idle trunk in trunk group 116 to its "home" toll center which is the New York regional center 100. Upon seizing an idle trunk in trunk group 116, the ten digits are outpulsed over the trunk to the New York regional center using one of the well-known pulsing techniques.

The control equipment at the New York regional center 100 receives the ten digits of information and, recognizing that the call is to the Miami area, interrogates its routing instructions to ascertain the proper trunk group over which to forward the call. In this illustrative example there is a direct trunk group 122 between the New York regional center 100 and the Miami local office 110. Ascertaining this from the routing instructions at the New York regional center, the common control equipment thereat will then attempt to select an idle trunk from trunk group 122, and if an idle trunk is available the called customer's telephone number will be outpulsed over that trunk to the Miami office. At the Miami office a connection will be established between the idle trunk selected from trunk group 122 and the telephone line serving customer 112, thereby completing a communication path between customer 111 in the New York area and customer 112 in the Miami area.

Had all the trunks in a direct trunk group 122 been occupied with other calls, the control equipment at the New York regional center 100 would ascertain from its routing instructions the next best alternate route to Miami and seek idle trunks in this route. In the example being described there is an alternate route provided via the Jacksonville sectional center which comprises trunk group 117 from New York to Jacksonville and trunk group 127 from the Jacksonville sectional center to Miami.

Of course during the busy period the common control equipment at the New York regional center 100 might find all trunks busy in both trunk groups 122 and 117. Under these circumstances an idle trunk will be sought from another alternate route which switches via the Atlanta regional center. This route comprises final trunk group 118 between the New York and Atlanta regional centers and trunk group 128 from Atlanta to Miami. A call over this route is forwarded in the same way as a call from New York to Miami via Jacksonville switching center.

Assuming that all trunks in the trunk groups 122, 117, and 118 in the various routes to Miami are busy, the call is (in conventional practice) then routed to an overflow tone trunk (not shown) to inform the calling customer that all trunks to Miami are temporarily unavailable. In the alternative, the call may also be routed to a delay quotation operation who informs the calling customer of the interval of delay which is anticipated in obtaining an idle circuit to Miami.

*Call from Buffalo to Miami via remote facilities*

As discussed above, the trunk group 120 from New York to Denver, the trunk group 124 from Denver to Atlanta and the switching equipment at Denver are normally unavailable to serve calls between the New York and Maimi areas. However, at approximately 9 a.m. Eastern standard time when most of the commercial establishments are beginning their business activities in New York and Miami areas the network between New York and Miami begins to reach its peak busy-period. Meanwhile, traffic through the Denver regional center 103 and traffic over trunk groups 120 and 124 between New York and Denver and betwen Denver and Atlanta, respectively, is relatively light and will not begin to reach its peak busy-period for two or more hours when the communities served by Denver regional center begin their normal business day. Although extremely long trunks are used when calls are routed via a remote network, it is desirable to temporarily borrow the Denver network facilities to help relieve any congestion that may occur in the New York to Miami network.

Connected to the Denver-Atlanta trunk group 124 is a load detector 130 which is set to operate when there is a sufficient margin of facilities available in that trunk group to accept traffic overflowing from another route without disrupting service normal to the Denver-Atlanta route.

In addition, there is a similar load detector 135 coupled to the Denver switching equipment. The switching load detector is operative when the normal traffic being offered to the switching equipment at Denver is at such a level that the equipment can accept additional traffic overflowing from another switching office without degrading the traffic normal to the Denver regional center 103.

Both of the aforesaid detectors are coupled over signaling channel 126 to the New York regional center 100. Signaling channel 126 comprises carrier terminals 131–134 coupled over carrier line 137, and signals are transmitted over this channel to the New York regional center to inform that center of the traffic load on the Denver switching equipment and on the Denver to Atlanta trunk group.

Further, although the New York to Denver trunk group 120 is normally not tested for idle trunks on calls between New York and Miami, there is a trunk load detector 136 at New York which monitors the availability of the trunks in this trunk group.

Let it now be assumed that customer 111 in Buffalo is attempting to call customer 112 in Miami and that all the trunks in the direct route comprising trunk group 122, the first choice alternate route including trunk group 117 and the final route including trunk group 118 are busy. Let it also be assumed that there are idle trunks in trunk group 120 to Denver and that signals are received over signaling channel 126 to inform the New York regional center 100 that the Denver switching office and the Denver to Atlanta trunk group 124 can accept overflow traffic without adversely affecting the traffic normal to these facilities. Under the above conditions an alternate routing control circuit 129 is actuated at the New York regional center to alter the routing instructions thereat. Instead of routing calls to overflow when trunks in the final route via Atlanta to Miami are busy, the New York regional center 100 will automatically divert some of the Miami traffic via the Denver network facilities comprising trunk groups 120 and 124 and switching office 103.

In other words, when the network which normally serves the New York to Miami traffic becomes congested and the remote network can accept additional calls without degrading customer service therein, the remote network is made available to handle portions of the New York to Miami traffic.

Of course, if the regular network for New York to Miami traffic restores to normal and can once again handle addition calls, the calls will be routed over their normal facilities instead of the remote Denver network. On the other hand, if the Denver facilities begin to congest because of the additional rerouted New York to Miami traffic, then the remote Denver facilities will once again be made unavailable to New York traffic.

The alternate routing control circuit at the New York regional center can be set to divert via the remote Denver facilities only portions of the New York to Miami traffic, while the remaining portions of the New York to Miami traffic are handled by other facilities.

*Detailed description*

Figure 1A:
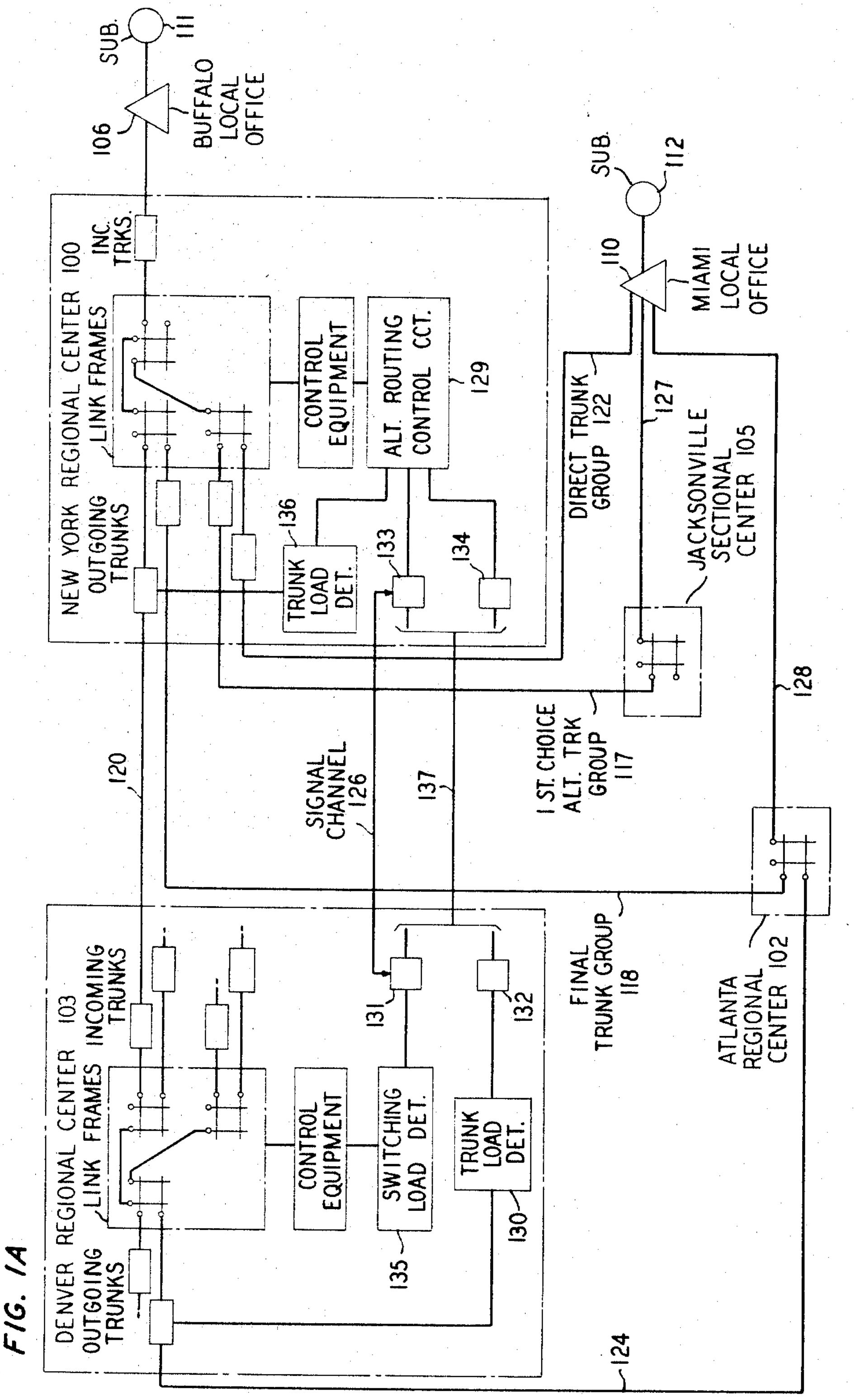
Figure 9:
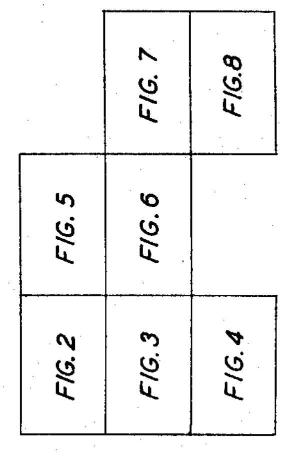
FIG. 9 shows the arrangement of FIGS. 2–8.

Referring now to FIGS. 2–8 as arranged in accordance with FIG. 9 there is shown a more detailed schematic representation of the same illustrative embodiment of the invention that was set forth in the block diagram of FIGS. 1 and 1A.

A detailed description of the arrangement contemplated wil now be given with respect to FIGS. 2–8 and wherever possible the reference designations that were used in a general description with reference to FIGS. 1 and 1A have been retained for the same equipment shown in more detail in FIGS. 2–8.

*Arrangement of equipment*

Figure 2:
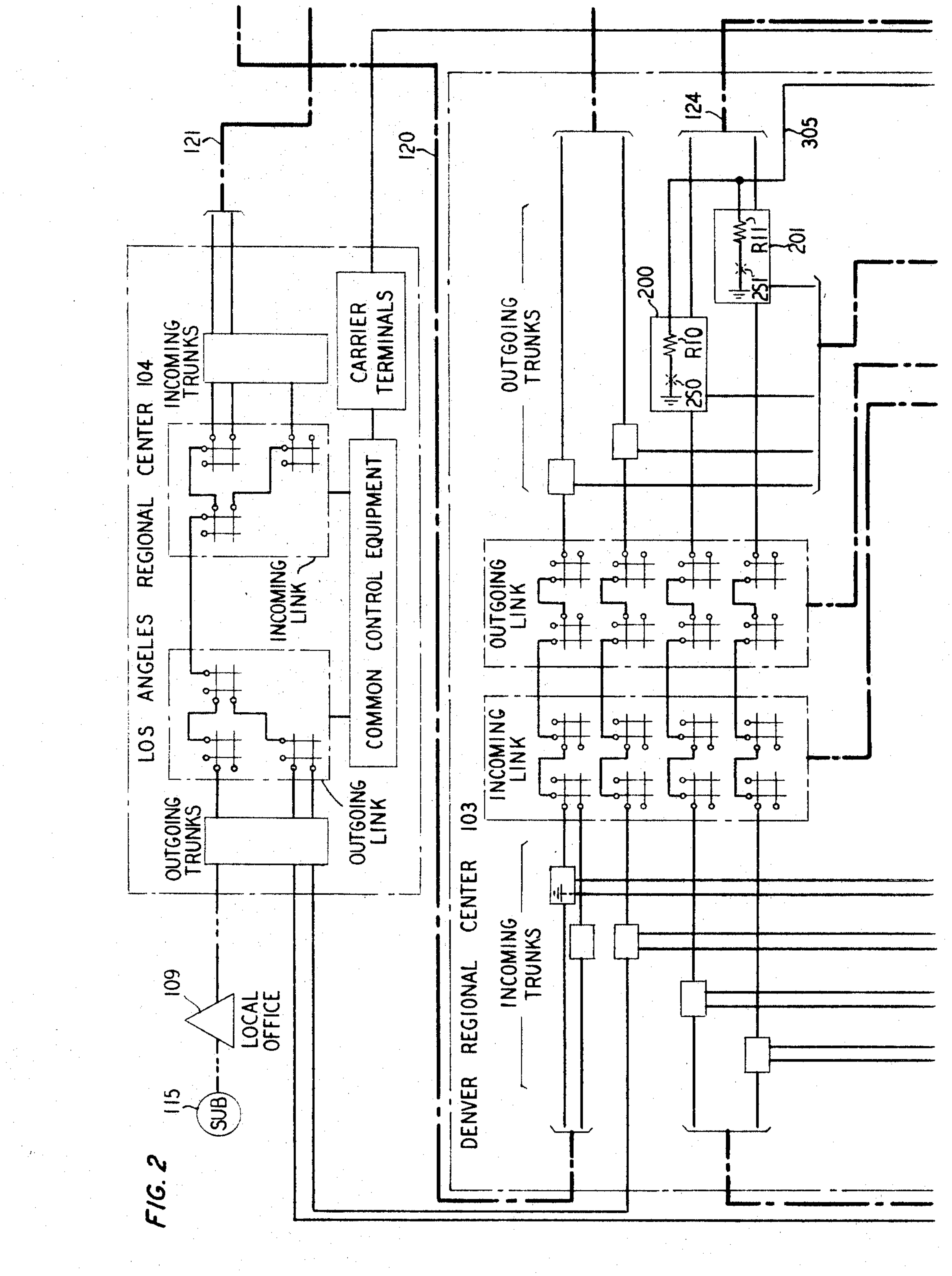
FIGS. 2–8 show a more detailed schematic representation of one specific illustrative embodiment of our invention in combination with the same telephone switching network.
Figure 3:
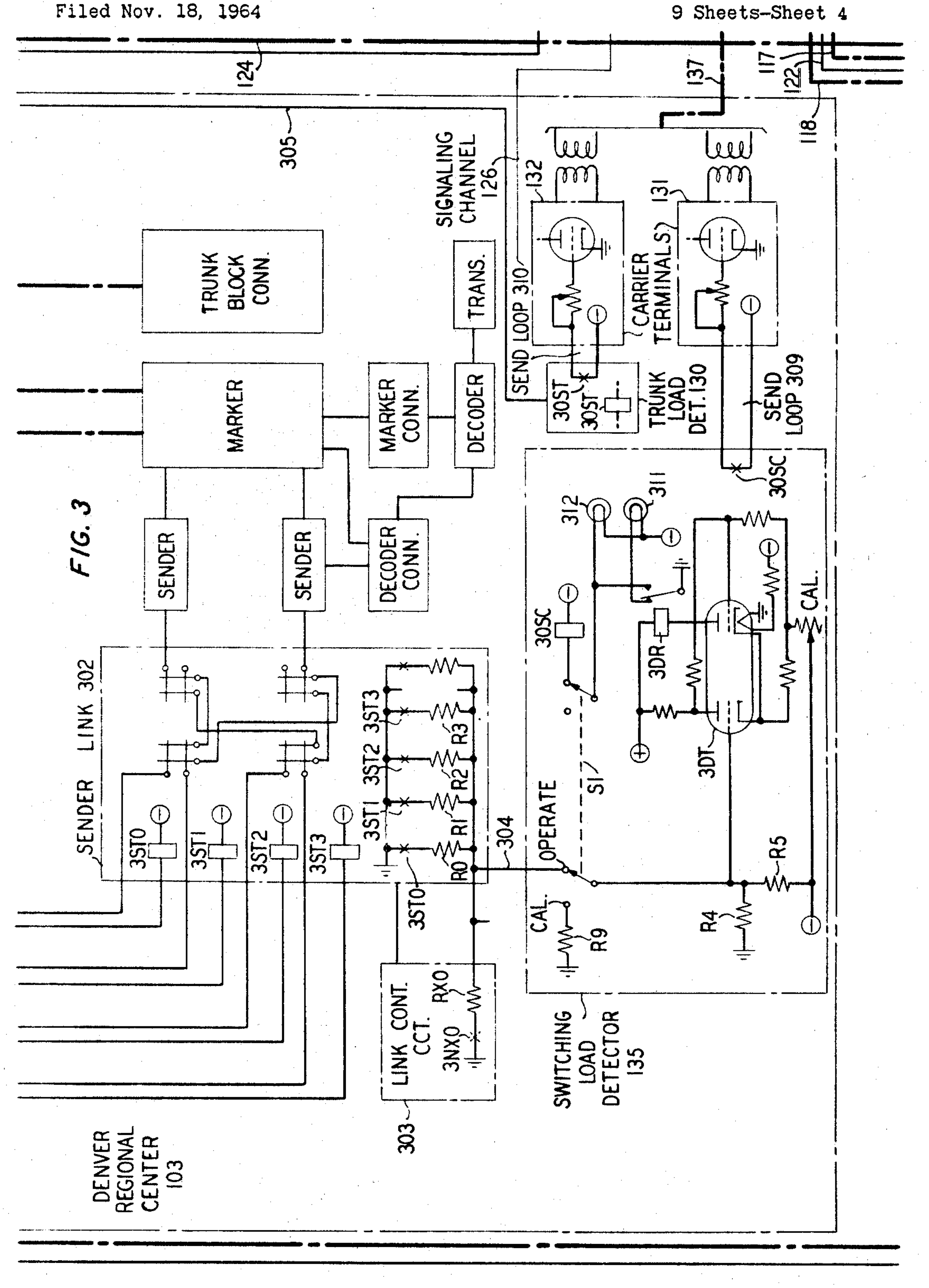

In general, FIGS. 2–8 have been arranged to depict the same telpehone network shown in the block diagram of FIGS. 1 and 1A FIG. 2 shows the Los Angeles regional center 104 and a portion of the Denver regional center 103, while FIG. 3 shows the remaining portion of the Denver regional center 103 including the traffic detector circuits located thereat.

Figure 4:
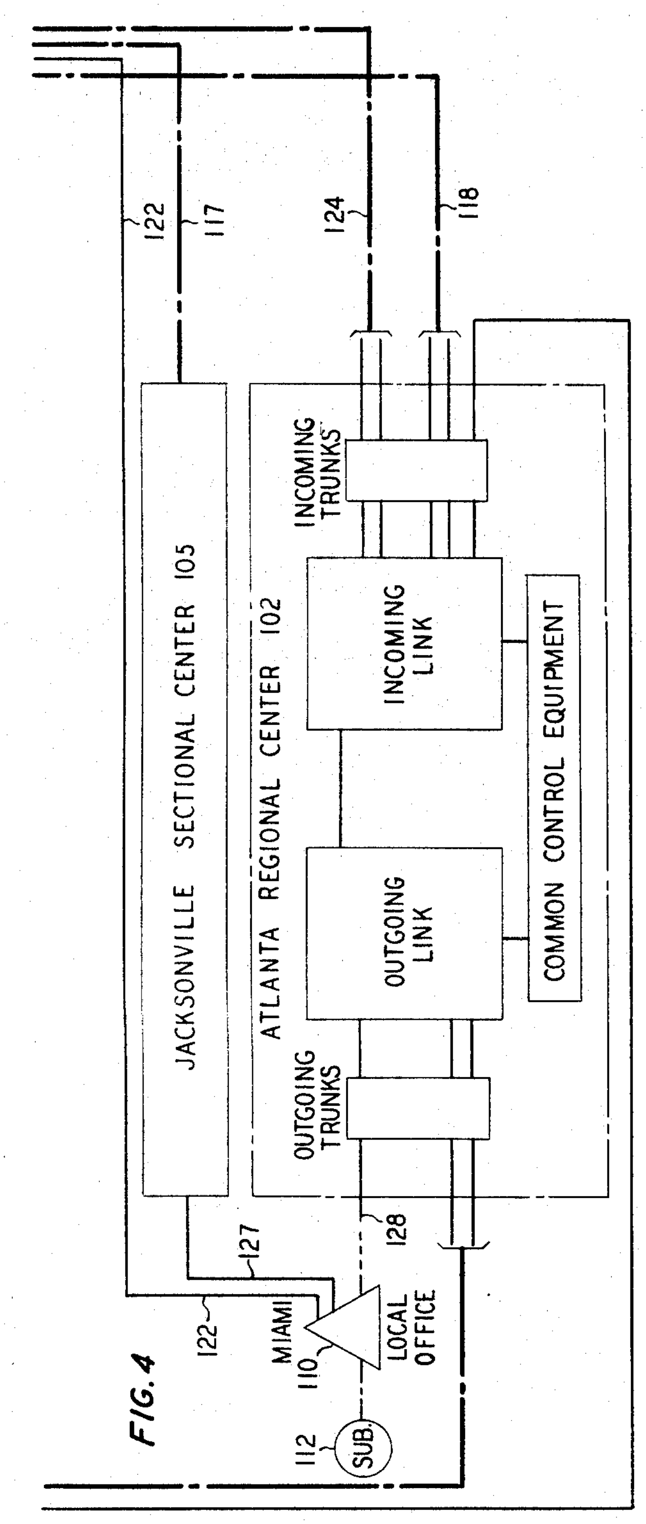

FIG. 4 shows the Atlanta regional center 102 and the Jacksonville sectional center 105 with the Miami local office 110 associated therewith.

Figure 5:
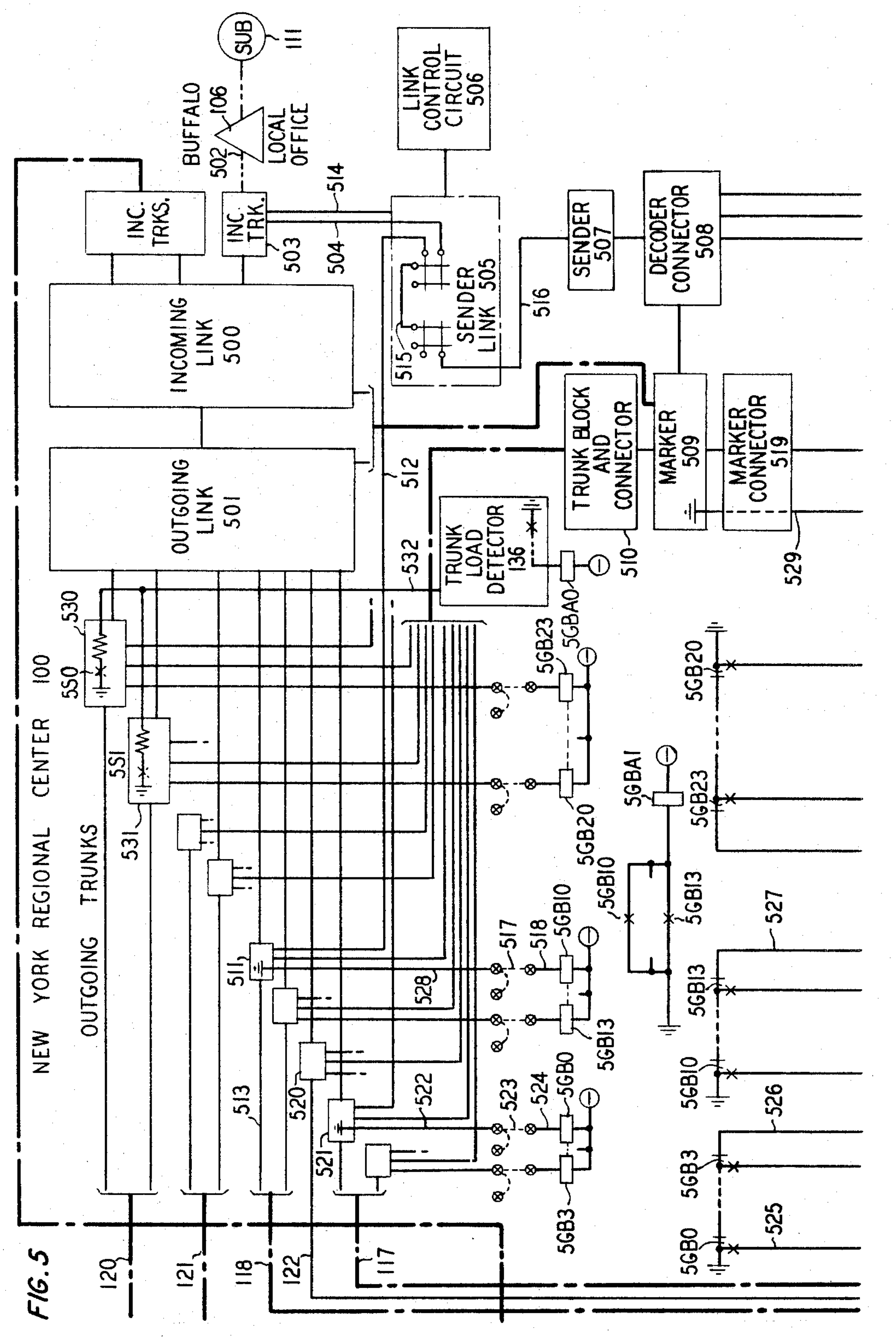
Figure 6:
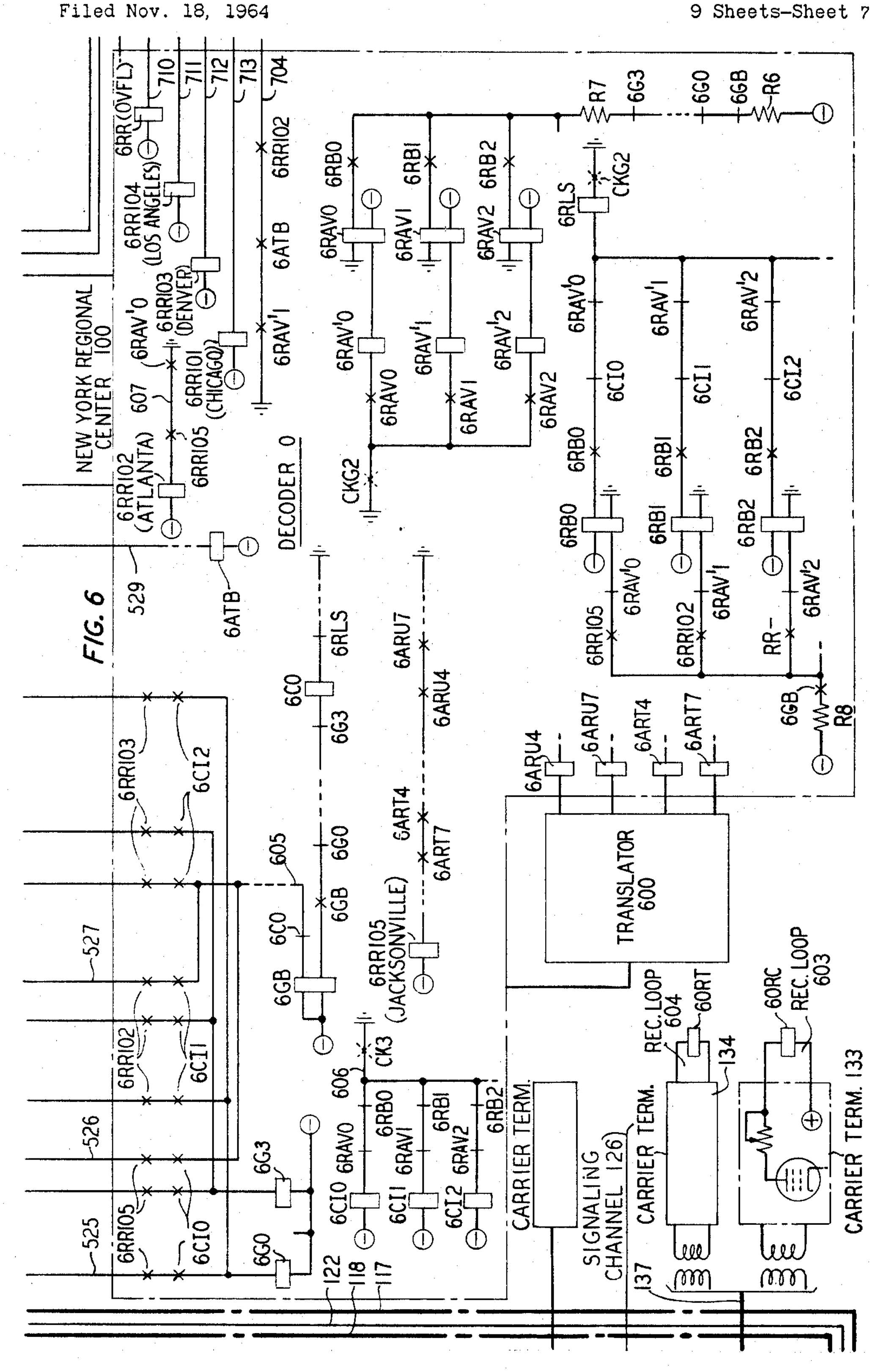

FIG. 5 shows a portion of the New York regional center 100 with the Buffalo local office 106 and FIG. 6 shows another portion of the common control equipment at the New York regional center 100.

Figure 7:
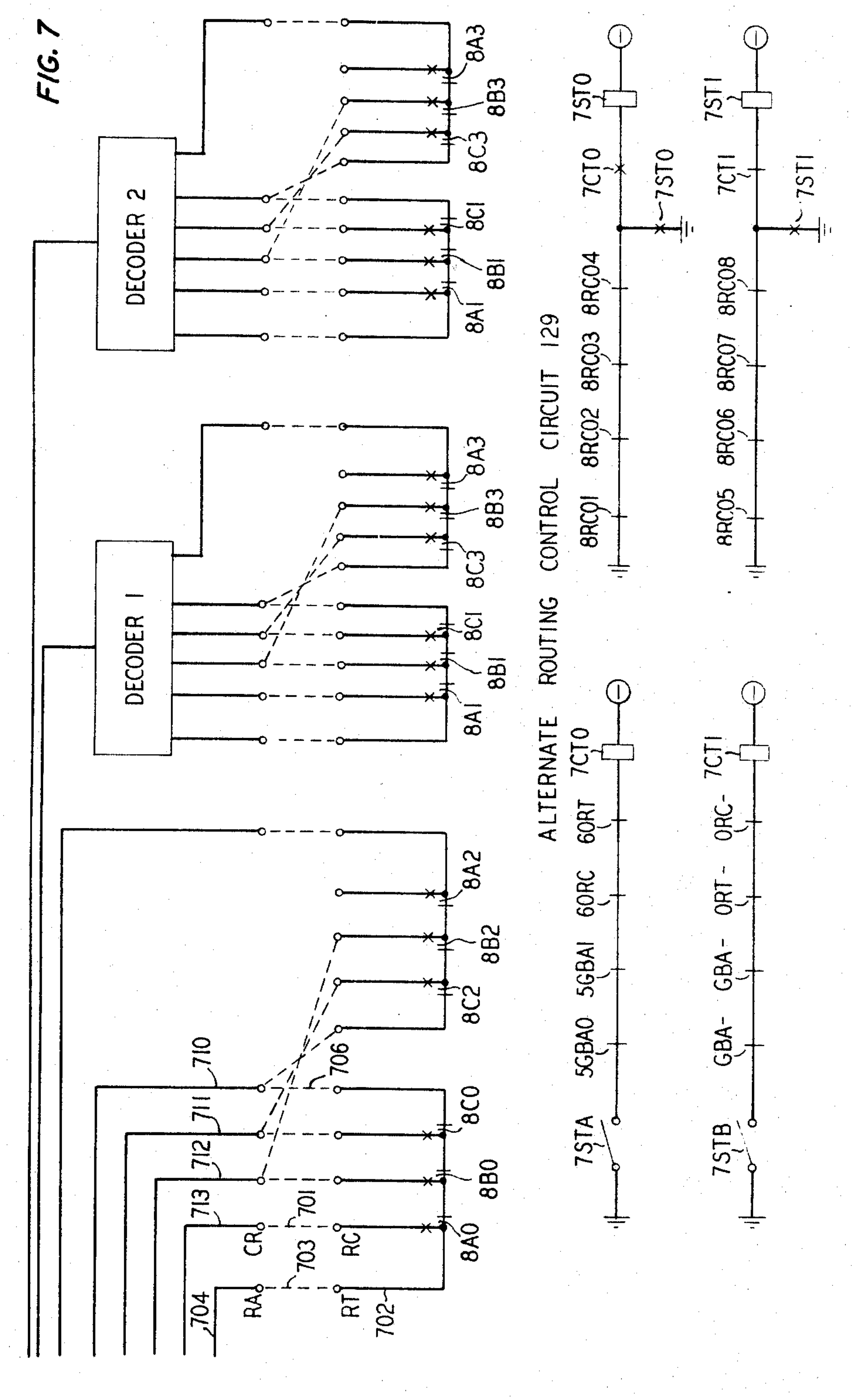
Figure 8:
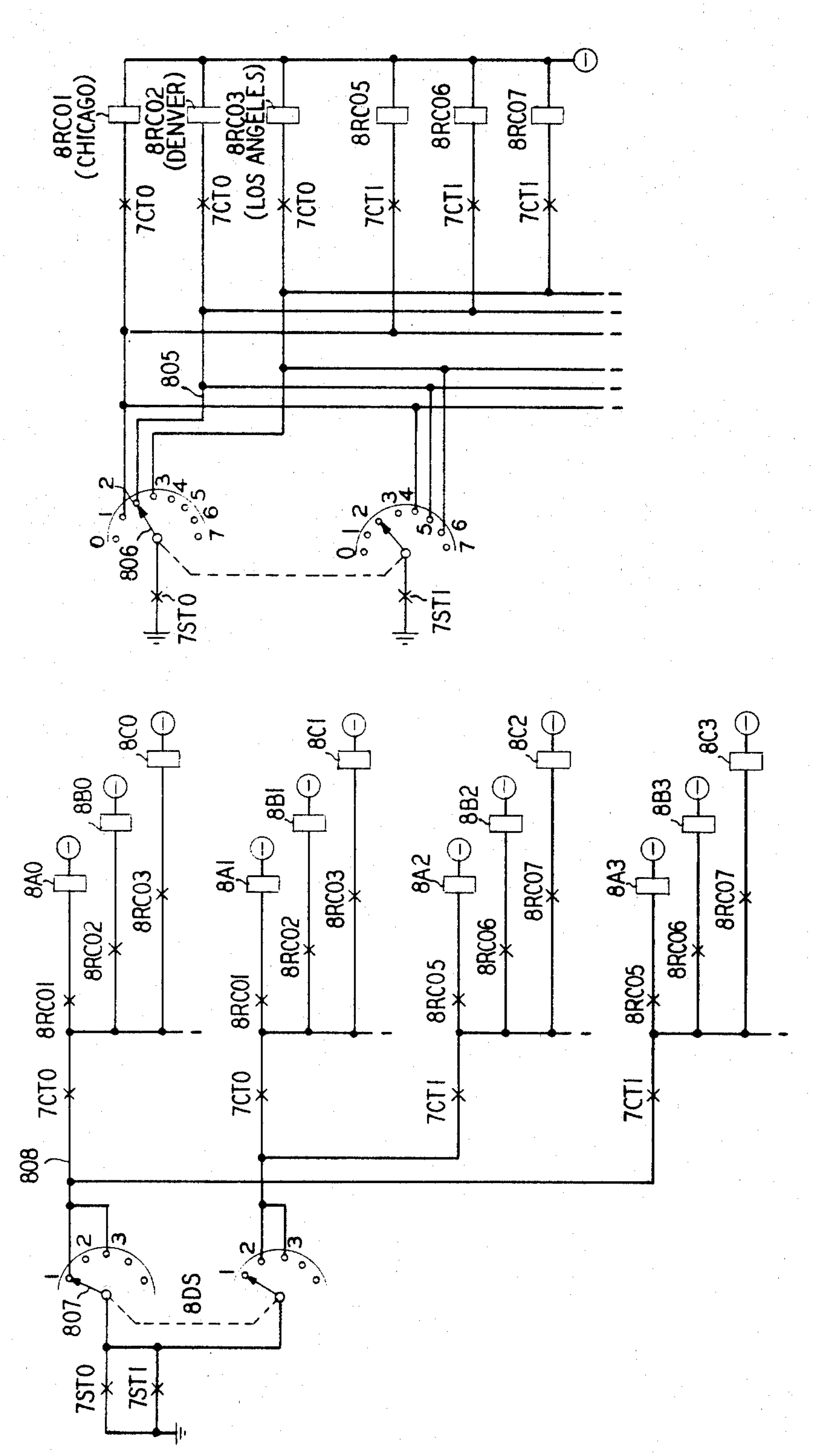

FIGS. 7 and 8 show the alternate routing control circuit 129 associated with some of the common control equipment at the New York regional center 100, and FIG. 9 shows the arrangement of FIGS. 2–8.

The regional centers represented by the various figures herein can be any one of the well-known switching systems. One example of a typical toll switching system suitable for use in this invention is disclosed in Patent 2,868,884 granted to J. W. Gooderham et al. of Jan. 13, 1959, and the Gooderham et al. patent is hereby incorporated by reference as though fully disclosed herein.

Turning first to FIGS. 5 and 6 there is shown the New York regional center 100 which comprises incoming link 500 on which incoming trunks are terminated, outgoing link 501 on which outgoing trunks appear and various elements of common control equipment to be described in more detail below.

Also shown in FIG. 5 is the Buffalo local office 106 which is connected over trunk conductors 502 to incoming trunk equipment 503 at the New York regional center. Although only one trunk has been shown interconnecting the local office 106 with the New York regional center 100, it will be realized that many trunks may be provided between these and other switching centers and that the trunks represented may include wire facilities, carrier, or radio links and the like.

A further description of the local switching offices, such as the Buffalo office 106, need not be given herein for a full understanding of the invention. It will be understood that any one of the well-known switching systems such as crossbar, step-by-step, etc., are equally suitable for this arrangement.

Incoming trunk equipment 503 at the New York regional center is connected over conductors 504 and 514 to sender link 505 and it is through sender link 505 and link control circuit 506 that trunk 503 can be connected to any one of the available senders such as 507. Link control circuit 506 functions to recognize which incoming trunks are requesting service and selects an idle sender of the proper type and then proceeds to close the appropriate crosspoints on sender link 505. Once connected to an incoming trunk, sender 507 receives the called customer's telephone number as it is outpulsed over trunk conductors 502 from the calling office 106. Sender 507 then passes the information received from the calling office to a decoder such as decoder 0 in FIG. 6 via decoder connector 508 and decoder 0, in conjunctoin with translator 600, utilizes this information to determine the proper routing of the call.

Once the routing information has been obtained from the translator 600, the various trunk groups in that route are surveyed by decoder 0 to ascertain which group of trunks has an idle trunk. The decoder then directs marker 509 to test the trunk group having at least one idle trunk by using trunk block connector 510 and thereby determine which trunks in that group are idle. When an idle outgoing trunk such as trunk 511 is selected, it is connected to the incoming trunk over the incoming and outgoing links, and the called number information is then outpulsed by sender 507 over the outgoing trunk conductors 513 to the distant switching center.

For simplicity it has been assumed that the Los Angeles regional center 104, the Denver regional center 103, the Atlanta regional center 102 and the Jacksonville sectional center 105 are identical to the New York regional center 100 described above and no further description of the aforementioned switching equipment for these other switching points need be given at this time.

While it has been assumed that the Denver regional center 103 comprises the same type of switching equipment as the other control switching points, certain of the equipment at the Denver regional center has been shown in more detail to illustrate one exemplary method of monitoring traffic thereat in accordance with one feature of our invention.

Referring now to FIG. 3 there is shown a switching load detector 135 in detail and a trunk load detector 130 in block diagram form. Switching load detector 135 is connected to sender link 302 and link control circuit 303 over conductor 304 and it is over conductor 304 that switching load detector 135 can monitor the number of incoming trunks that are awaiting service by the Denver regional center control equipment. While we have found it convenient to measure the traffic load on the switching equipment by monitoring the sender link and link control circuits in this illustrative embodiment of our invention, it is to be understood that similar measurements can be made at other common control equipment. The choice of equipment to be monitored of course depends on the nature of the traffic at a particular switching center and the type of switching equipment involved, and this can be readily ascertained using any of the well-known traffic measuring arrangmeents.

Trunk load detector 130 is identical to switching load detector 135. However, detector 130 is coupled over conductor 305 to outgoing trunks 200 and 201 which extend to the Atlanta regional center. Trunk load detector 130 measures the quantity of trunks occupied in trunk group 124 to Atlanta.

In a similar manner, trunk load detector 136 at New York (FIG. 5) is coupled to trunks 530 and 531 in trunk group 120 between New York and Denver, and trunk load detector 136 measures the number of trunks occupied in that trunk group.

Load detectors 135 and 130 at Denver are coupled over signaling channel 126 to the New York regional center 100, and it is over this signaling channel that the load detectors at the Denver regional center 103 can inform the New York regional center of the specific traffic conditions being experienced by the Denver switching equipment and the Denver to Atlanta trunk group 124.

Signaling channel 126 comprises carrier terminals 131 and 132 at the Denver regional center 103 and carrier terminal 133 and 134 at the New York regional center 100, and the carrier terminals are interconnected by carrier line 137.

A typical example of a carrier system which has been found applicable to our invention is disclosed in Patent 2,667,536, granted to L. A. Gardner and J. L. Hysko of Jan. 26, 1954 and the carrier terminals set forth in the Gardner-Hysko patent are hereby incorporated by reference as though fully disclosed herein.

In that patent, Gardner and Hysko disclose a frequency shift telegraph carrier system having a carrier terminal at each end of a carrier line, and each carrier terminal includes a "send" loop and a "receive" loop. When each terminal has power connected thereto that terminal sends carrier signals over the interconnecting carrier line to the distant terminal carrier receiving circuit. For this embodiment of our invention only the sending circuits are shown for the carrier terminals 131 and 132 at the Denver regional center, and only the receiving circuits are shown for the carrier terminals 133 and 134 located at the New York regional center.

Once having turned the carrier terminals "on" by having power connected thereto, the terminals can transmit and receive frequency shift signals over the carrier line. More specifically, when send loop 309 at carrier terminal 131 is open, a first frequency sometimes referred to as a "spacing" signal is sent over the carrier line to the distant terminal 133. When send loop 309 is closed by contacts of the 30SC relay, however, a frequency shift occurs and carrier terminal 131 transmits a second frequency referred to as a "marking" signal over carrier line 137 to carrier terminal 133 at the New York regional center. At carrier terminal 133 the receipt of a "marking" signal will close receive loop 603 and operate overload receive relay 60RC thereat. In other words, each time send loop 309 is closed receive loop 603 is also closed to operate relay 60RC. Similarly, when send loop 310 is closed by relay 30ST, receive loop 604 is also closed to operate overload receive relay 60RT.

Located at the New York regional center 100 and controlled by signals over signaling channel 126 from the Denver regional center is alternate routing control circuit 129, part of which is shown in FIGS. 7 and 8. When actuated the alternate routing control circuit can alter the routing of traffic at the New York regional center to provide additional routes to a designated called office, and the alternate routing control circuit can also cause only selected portions of the traffic to be routed via these routes.

It will be recalled from the general description that the decoder primes a translator with the area code, called office code and telephone number of the called customer and receives from the translator instructions as to the proper routing of the call. The decoder would be informed of the direct and alternate routes that are available and proceed to call in a marker to select an idle trunk from one of the trunk groups in the designated routes. Of course, the marker will first attempt to select an idle trunk in the most direct route, and if these trunks are busy the marker will attempt to select an idle trunk from one of the alternate routes beginning with the most preferred alternate route.

If all direct and alternate route trunks are busy and alternate routing control circuit 129 is not actuated, the call will be routed to an overflow trunk. If, however, the alternate routing control circuit is actuated, additional routes via remote network facilities are made available in accordance with the operation of regional center selector switch 8RCS in FIG. 8.

The operation of the alternate routing control circuit will be described in more detail subsequently, but it can be seen in FIG. 8 that the different settings of switch 8RCS will cause different regional center relays (8RC–) to operate and thus cause traffic to be routed via different remote regional centers. For example, when switch 8RCS is in position 2 (as shown) a path is partially completed for operating relay 8RC02, and the operation of this relay causes the decoders to route certain traffic via the Denver regional center 103. In a similar manner, relay 8RC03 is operated when the switch is in position 3 to cause the decoders to route traffic via the remote regional center 104 at Los Angeles.

Since it is not always desirable to alter the routing of all traffic to a particular point, the alternate routing control circuit is equipped with a decoder selector switch 8DS in FIG. 8. When rotated to different positions switch 8DS is effective to cause different numbers of decoders to alter the normal routing of certain traffic.

A better understanding of the arrangement contemplated will be appreciated from the ensuing description with respect to the establishment of a typical call over the switching network when the network is experiencing normal traffic conditions followed by a description of a similar call wherein all of the conventional direct and alternate routes are unavailable.

*Call from Buffalo to Miami*

Let it be assumed that customer 111 served by the Buffalo local office 106 (FIG. 5) wishes to call customer 112 served by the Miami local office 110 (FIG. 4), and also let it be assumed that there are idle trunks in all of the direct and alternate routes to Miami.

Customer 111 at Buffalo lifts his telephone receiver and by using a dial or a key set thereat transmits to the Buffalo local office 106 information as to the area code for Miami followed by the office code for local office 110 and the telephone number assigned to the called customer 112. As previously assumed with respect to the general description, this information might consist of ten digits such as 305–CH3–1000 wherein the first three digits represent the Miami area code, the next three digits are the office code for local office 110 in Miami and the last four digits represent the telephone number of the called customer 112.

Upon receiving this information, the switching equipment at local office 106 recognizes that the area code 305 is one assigned to a foreign area and selects a trunk such as trunk 502 to its "home" toll center which is the New York regional center 100 in the instant example. When trunk 502 is seized by local office 106, incoming trunk equipment 503 is actuated and a signal is sent over conductors 514 to sender link 505 and link control circuit 506 requesting that the proper type sender be attached to the incoming trunk 503. An idle sender is chosen, and the select magnets of the proper switch levels are operated by link control circuit 506 thus connecting incoming trunk 503, over conductors 504, link 515 and conductors 516 to sender 507. When sender 507 is connected to the trunk, a signal is transmitted back over trunk conductors 502 to local office 106 requesting that the local office outpulse the ten digits of information stored therein.

After sender 507 receives the ten digits outpulsed from local office 106, the sender connects itself to a decoder circuit, such as decoder 0 in FIG. 6, via decoder connector 508. Decoder 0 functions in conjunction with translator 600 to translate the received information into the proper instructions so that the appropriate trunk routes can be selected.

Decoders 0, 1 and 2 shown in FIGS. 6 and 7 are illustratively of the type disclosed in the aforementioned Gooderham et al. patent, and wherever possible the reference designations used in that patent have been retained herein except that the letter designations denoting certain functional characteristics of the equipment in Gooderham et al. have been prefixed herein by a number indicating the figure of the instant drawing where that equipment is located.

In the Gooderham et al. patent it was shown that each decoder comprises a plurality of control circuits for enabling the seizure of a translator which can translate the information concerning the destination of a desired call which is received from the sender into information required by a marker to extend the desired connection to another control switching point. To enable the translation of information concerning the destination of a desired call into directive information which enables the marker to control the establishment of a call, a card translator was disclosed in the Gooderham et al. patent. For simplicity, a similar translator generally represented by the block diagram 600 has been shown herein. It will be understood that a complete description of the translator and its capabilities can be found in the aforementioned Gooderham et al. patent. However, a brief description of the translator will be helpful at this time for a better understanding of the arrangement contemplated herein.

As disclosed in the Gooderham et al. patent the translator comprises a plurality of cards upon which various bits of information are stored. This information might contain routing instructions, the location of trunks on the various switch frames, class of service information, and so forth. Ordinarily, a selection of the first card is determined by the area code digits received from the sender, but the local office code digits may also be used. Provision is made for various routing instructions such as card-to-card, card-to-relay, relay-to-relay, etc., but for ease of illustration the description with respect to the instant invention will be limited to a call on a card-to-relay basis and it will be obvious to those skilled in the art that this invention is also applicable to calls handled in many other ways.

It will be recalled from the general description that three routes are available between calls originating at the Buffalo local office 106, which homes on the New York regional center 100, and the Miami local office 110 homing on the Jacksonville sectional center 105. The first route comprises direct trunks in trunk group 122 between the New York regional center 100 and the Miami local office; the second or first choice alternate route comprises trunk groups 117 and 127 interconnected via the Jacksonville sectional center 105 and the final route comprises trunk groups 118 and 128 switching via the Atlanta regional center 102.

On a call which is handled on a card-to-relay basis as set forth in the Gooderham et al. patent, the first card selected in the translator tells the decoder that the first route may be set up by the marker in accordance with information supplied from the card and that there are alternate routes which may be selected under control of an "alternate route tree" in the decoder. While the marker is testing for an idle trunk in the direct group of trunks, the decoder checks for an idle trunk through the use of route relays representing the alternate routes. If no idle trunks are found in the direct route, an all-trunk-busy indication is sent from the marker to the decoder and an attempt is made to select idle trunks from the first choice alternate route. If no idle trunks are available therein, an attempt is made to select an idle trunk from the final trunk group. Finally, if no idle trunks are available in any of the direct or alternate routes, the call is directed to an overflow tone trunk informing the calling customer that no idle paths are available to the called office.

Each route relay, such as route relay 6RR102 associated with trunk group 118 to Atlanta, is arranged to cut in four subgroup chain leads for determining if there is an idle trunk in that trunk group. The trunks as shown in the Gooderham et al. patent are arranged in four subgroups each having as many as 40 trunks with a group busy chain relay for each subgroup. A typical group busy arrangement is shown in FIG. 5 wherein relays 5GB10–5GB13 are associated with the four subgroups of trunks in trunk group 118 between the New York regional center 100 and the Atlanta regional center 102. In a similar manner, chain relays 5GB0–5GB3 are associated with trunk group 117 which goes to Jacksonville from the New York regional center and chain relays 5GB20–5GB23 are associated with trunk group 120 between the New York regional center and the Denver regional center 103. Only one trunk has been shown in each subgroup, and these trunks are cross connected to their corresponding group busy (GB–) relays. When the trunk equipment such as trunk 511 is idle, it extends ground over conductor 528, cross connection 517 and conductor 518, through to the winding of relay 5GB10 to battery, operating that relay. Similarly, other trunks in subgroup 10 are cross connected to relay 5GB10 and as long as one trunk in this subgroup is idle relay 5GB10 will be operated. As each trunk is taken for use, its ground is removed from the corresponding lead to the GB– relay, and when all trunks in a particular subgroup are in use the corresponding GB– relay will be released indicating an all-trunk-busy condition in that particular subgroup.

Returning now to the description of a call from the Buffalo local office 106 to the Miami local office 110 it will be recalled that the call had progressed to a point where the ten digits representing the called customer had been registered in decoder 0 at the New York regional center. When decoder 0 primes translator 600 with the six digits 305–CH3 a card is selected and read in translator 600. This card contains routing instructions which inform decoder 0 that the call is to be handled on a card-to-relay basis. The card contains information as to the trunk block and connector location of the direct group of trunks to Miami and also an alternate route pattern number the function of which will be described subsequently. Decoder 0 then directs marker 509, through marker connector 519, to test for an idle trunk in the direct route to Miami which comprises trunk group 122.

The testing and selection of an idle trunk is fully disclosed in the Gooderham et al. Patent 2,868,884 and need only be briefly described herein for a complete understanding of our invention. For example, if an idle trunk is found in the direct trunk group to Miami, that trunk will be selected by marker 509. Marker 509 will then assume control of the call permitting decoder 0 to release. Having selected an idle direct trunk to Miami such as outgoing trunk 520, marker 509 identifies the incoming link 500 on which the incoming trunk 503 from Buffalo appears and proceeds to establish a talking connection between incoming trunk 503 and outgoing trunk 520 over the link frames 500 and 501.

The decoder connector 508 and the trunk block and connector 510 are then permitted to release, and sender 507 assumes control of the call waiting for an idle sender to be attached to the distant end of the trunk at the Miami local office.

In the meantime, while the marker is attempting to select an idle trunk in the direct route, the decoder is preparing for alternate routing if required. When decoder 0 was initially seized by sender 507, certain check relays such as CK3 and CKG2 were operated to prepare the decoder 0 for operation. While only contacts of these relays have been shown in FIG. 6, it is to be understood that these relays were operated in accordance with the description given in the aforementioned Gooderham et al. patent, and no further description of these relays and their function need be given herein for a complete understanding of the instant invention. With relay CK3 operated a circuit is closed from ground through its contacts, over conductor 606, through normal contacts of relays 6RB0 and 6RAV0 and through the winding of relay 6CI0 to battery, operating relay 6CI0. A similar circuit can be traced through contacts of relays 6RB1 and 6RAV1 for operating relay 6CI1 and also through contacts of relays 6RB2 and 6RAV2 to operate relay 6CI2.

As mentioned above, when the first card is read decoder 0 receives a two digit number from translator 600 indicative of the alternate route pattern. Let it be assumed that the alternate route pattern number for the call being described is "00" and therefore relays 6ARU4, 6ARU7, 6ART4 and 6ART7 in decoder 0 are operated by translator 600 thereby indicating the alternate route pattern number on a two-out-of-five basis. With these relays operated a circuit is completed for operating the route relay for the first choice alternate route which includes trunk group 117 switching via the Jacksonville sectional center 105. This circuit can be traced from battery through the winding of route relay 6RR105 through contacts of relays 6ART7, 6ART4, 6ARU4 and 6ARU7 to ground operating route relay 6RR105.

With relays 6RR105 and 6CI0 operated, a circuit is prepared for testing for idle trunks in the subgroups of the first choice alternate route which comprises trunk group 117 to Jacksonville. If there are idle trunks in any of the subgroups in the trunk group 117, they will extend ground to operate a corresponding one of the group busy chain relays 5GB0–5GB3. More specifically, if it is assumed that trunk 521 in trunk group 117 is idle, ground will be extended over conductor 522, cross connection 523, conductor 524 and through the winding of group busy chain relay 5GB0 to battery, operating relay 5GB0. Relay 5GB0 in operating extends ground over conductor 525 to FIG. 6, through contacts of relay 6RR105 and 6CI0 and through the winding of relay 6G0 in the decoder, informing the decoder that there is an idle trunk in subgroup 0 of trunk group 117 to Jacksonville.

Meanwhile, marker 509 has been testing the direct trunks to Miami through the use of trunk block and connector 510. If all trunks in the direct trunk group 122 are busy, marker 509 will transmit ground over conductor 529 through marker connector 519 and through the winding of relay 6ATB in FIG. 6 to battery to operate all-trunk-busy relay 6ATB. With relay 6ATB operated and relay 6G0 operated the decoder knows that all trunks are busy in the direct route but there are idle trunks in one of the subgroups of the first choice alternate route via the Jacksonville sectional center. The decoder will then cause another card to be selected in translator 600 to ascertain the location of the idle trunks in trunk group 117 to Jacksonville. The marker then proceeds to test and select an idle trunk and establish a connection between a selected trunk and incoming trunk 503 in the manner priorly described.

Let it now be assumed that there are no idle trunks in the first choice alternate route comprising trunk group 117 and therefore relays 5GB0–5GB3 would be released. It will be recalled that when decoder 0 prepared for alternate routing, route relay 6RR105 and relay 6CI0 were operated. With relays 5GB0–5GB3 now released, ground is extended through normal contacts of those relays, over conductor 526, through contacts of relays 6RR105 and 6CI0 and over conductor 605, through normal contacts of relay 6C0 and through the upper winding of relay 6GB to battery, operating relay 6GB.

Relay 6GB operates indicating that all trunks are busy in the trunk group being tested and extends battery through its lower winding, through its own contacts and contacts of relays 6G0–6G3, through the winding of relay 6C0, through normal contacts of relay 6RLS, to ground operating relay 6C0 and furnishing a locking path for relay 6GB under the control of relay 6RLS.

In addition, relay 6GB extends battery through resistance R8, through its own operated contacts, through operated contacts of route relay 6RR105, through normal contacts or relay 6RAV'0 and through the lower winding of relay 6RB0 to ground, operating relay 6RB0. In operating, relay 6RB0 completes a circuit which can be traced from battery, through its upper winding, through its operated contacts, through normal contacts of relays 6CI0 and 6RAV'0 and through the winding of relay 6RLS to ground through operated contacts of relay CKG2. The latter circuit provides a locking circuit for relay 6RB0 and also operates relay 6RLS.

When relay 6RB0 operated it opened its contacts to release relay 6CI0, and relay 6CI0 opens its contacts to disconnect conductor 526 from the winding of relay 6GB. Relay 6CI0 also disconnects conductor 525 and similar conductors from the windings of relays 6G0–6G3 in the decoder. Relay 6RLS having priorly operated to open the locking path for relay 6GB and the operating path for relay 6GB now being opened by relay 6CI0, relay 6GB releases.

With relays 6G0–6G3 and relay 6GB released a circuit is now completed for operating a route advance relay. This circuit can be traced from battery through resistance R6, through normal contacts of relays 6GB and 6G0–6G3, through resistance R7, through operated contacts of relay 6RB0 and through the upper winding of relay 6RAV0 to ground, operating relay 6RAV0. In operating, relay 6RAV0 completes a circuit from ground at contacts of relay CKG2, through its own contacts, through the winding of relay 6RAV'0 and through the lower winding of relay 6RAV0 to battery, operating auxiliary relay 6RAV'0 and holding relay 6RAV0 under control of relay CKG2.

Relay 6RAV0 further interrupts the operating circuit for relay 6CI0.

Relay RAV'0 in operating also completes an operating circuit for the route relay 6RR102 which is associated with the final trunk group 118 to the Atlanta regional center 102. The operating circuit for this relay can be traced from ground, through contacts of relay 6RAV'0, over conductor 607, through contacts of relay 6RR105 and through the winding of route relay 6RR102 to battery, operating that relay. With route relay 6RR102 and cut-in relay 6CI1 operated, the group busy leads for the subgroups of trunks in trunk group 118 are extended to decoder 0, and decoder 0 now looks for a subgroup having an idle trunk therein in the same manner as described above with respect to the ascertaining of a subgroup having idle trunks in trunk group 117 leading to the Jacksonville sectional center 105.

At this point in the call the decoder has searched for an idle trunk in the subgroups of the first choice alternate route via Jacksonville (trunk group 117) and is now looking for an idle trunk in one of the subgroups in the final route comprising trunk group 118 to the Atlanta regional center 102, and in the meantime, marker 509 has been searching for an idle trunk in the direct trunk group 122 to Miami. If the marker 509 is unable to select an idle trunk in a direct trunk group to Miami, a signal is transmitted back over conductor 529 to decoder 0 operating relay 6ATB therein. In addition, if there are no idle trunks in trunk group 118 to the Atlanta regional center, relay 6GB in the decoder 0 will again be operated to indicate an all trunk busy condition in that trunk group. This circuit can be traced from ground through normal contacts of relay 5GB10–5GB13, over conductor 527 through operated contacts of relays 6RR102 and 6CI1, over conductor 605, through normal contacts of relay 6C0 and through the upper winding of relay 6GB, operating that relay.

The decoder now route advances in the same manner as described above. Relay 6GB completes operating circuits for operating relays 6C0 and 6RLS as before and also completes an operating circuit for relay 6RB1. Relay 6RB1, in operating, releases relay 6CI0 which opens up the group busy leads for the subgroups in trunk group 118, once again causing relay 6GB to release. With relay 6GB released and relay 6RB1 operated a circuit is now completed for the next route advance relay 6RAV1 which operates. Relay 6RAV1 in operating operates relay 6RAV'1 in an obvious manner.

With relays 6RAV'1 and 6ATB operated and route relay 6RR102 operated a circuit is completed for operating route relay 6RR(OVFL) which is associated with a group of overflow tone trunks. This circuit can be traced from battery through the winding of route relay 6RR(OVFL), over conductor 710 to FIG. 7, over cross connection 706 to the alternate routing control circuit, through normal contacts of relays 8C0, 8B0, 8A0 and back over conductor 702, over cross connection 703 and conductor 704 to FIG. 6 and through operated contacts of route relay 6RR102, all-trunk-busy relay 6ATB and route advance relay 6RAV'1 to ground, thereby operating the route relay 6RR(OVFL) for the overflow tone trunks.

Decoder 0 will now request that marker 509 select an idle overflow tone trunk (not shown) and interconnect that trunk with the incoming trunk 503. Upon connecting incoming trunk 503 to the overflow tone trunk, the calling customer 111 receives a tone indicating that there are no idle circuits available in the normally designated routes to Miami, and should customer 111 still desire to place his call, he must wait until circuits become available.

Thus, it can be seen in this exemplary embodiment that under normal circumstances a call incoming to the New York regional center and destined for the Miami local office 110 is handled in such a manner that three routes are tested to Miami.The first route comprises direct trunks to Miami in the trunk group designated 122. The second route comprises trunk group 117 between the New York regional center and the Jacksonville sectional center and trunk group 127 from Jacksonville to Miami, and the final route comprises trunk group 118 between the New York and Atlanta regional centers and trunk group 128 from Atlanta to Miami. Through marker and decoder operations, the above routes are tested in the order given, and if no idle trunks are available in any of the routes, the call is disposed of by returning overflow tone to the calling customer who must make repeated attempts to complete his call until circuits are available.

*Call from Buffalo to Miami via normally Inaccessible Elongated Route*

In the above description, a call from Buffalo to Miami was blocked due to all-trunk-busy conditions in the normal network facilities. It will be recalled however from the general description that while certain portions of a network may be congested, other portions of the network may be experiencing very little traffic due to differences in customer calling habits, time zone differentials, and the like. A detailed description will now be given of a call between the Buffalo local office 106 and the Miami local office 110 assuming that all of the normal network facilities are congested but that switching and trunking facilities via the Denver regional center 103 are available.

Turning first to FIG. 3 there is shown a portion of the Denver regional center 103 comprising sender link 302, link control circuit 303 and various other elements of common control equipment. In accordance with an aspect of our invention, detector circuits have been located at the Denver regional center to monitor the traffic conditions thereat. For example, in this illustrative embodiment switching load detector 135 is coupled to link control and sender link circuits 303 and 302 respectively, and in a similar manner trunk load detector 130 is coupled to the outgoing trunk circuits such as 200 and 201 in trunk group 124, which extend to the Atlanta regional center 102.

Load detectors 135 and 130 are assumed to be identical; however, only switching load detector 135 has been shown in detail. Detector 135 comprises a trigger circuit including tube 3DT and a detector relay 3DR which is operated by tube 3DT. It should be understood that the detector arrangement as shown herein is merely illustrative, and it will be obvious to those skilled in the art that many other detector circuits can be substituted for the arrangement shown herein without departing from the spirit and scope of the instant invention. It should also be realized that detector circuits 135 and 130 or similar detector circuits can be arranged to monitor other equipment at the Denver regional center 103. The selection of equipment to be monitored for ascertaining the traffic conditions thereat will of course depend on a particular type of switching system involved.

Continuing now with a description of detector circuit 135, it can be seen that the potential on the grid circuit of the first half of tube 3DT is dependent on resistances R4 and R5 and a number of resistances RX0 and R0–R3 that are connected to the grid by their corersponding relays 3NX0 and 3ST0–3ST3. As set forth in the aforementioned Gooderham et al. patent, the operation of a group start relay (3ST–) in the sender link is an indication that one of the incoming trunks in the corresponding group of trunks has been seized and is requesting that a link control circuit select and attach an idle sender to the incoming trunk. Relays such as the 3NX0 on the other hand indicate those link control circuits that are busy interconecting trunks at the various sender links. Of course it will be realized that if other equipment is monitored relays in that equipement similar to the 3ST– and 3NX0 will also be provided for controlling the bias on tube 3DT. Thus, the more 3NX– and 3ST– relays that are operated the less negative the grid of the first half of tube 3DT becomes until the first half of tube 3DT is triggered "on" that is, it conducts, thereby cutting off the second half of tube 3DT and releasing relay 3DR.

The adjustment of the "triggering point" of tube 3DT is accomplished by operating switch S1 to its calibrate position to connect resistance R9 to the grid circuit of tube 3DT. The value of resistance R9 is selected to simulate the desired number of 3ST– and 3NX– relays on which the trigger circuit is to operate, and of course, the selection of the number of relays it determined on the basis of previous traffic studies for a given switching center.

With switch S1 operated to the "calibrate" position, the calibrate potentiometer CAL can be adjusted to trigger tube 3DT, and when the first half of tube 3DT conducts, the second half cuts off and relay 3DR releases. The calibration potentiometer CAL is then "backed off" just enough to prevent tube 3DT from triggering as indicated by the operation of relay 3DR and the lighting of no overload lamp 311.

After satisfactory adjustment has been made, switch S1 is restored to its "operate" position thereby disconnecting tube 3DT from the calibrate resistor R9 and connecting the grid of the tube to link control circuit 303 and sender link 302 over conductor 304.

Having priorly adjusted switching load detector 135 tube 3DT will now be triggered when a predetermined number of 3NX– and 3ST– relays are operated to indicate the level of traffic waiting for switching equipment at the Denver regional center 103. When relay 3DR releases it closes its contacts to light overload lamp 312 and also operate relay 30SC. Relay 30SC in operating closes send loop 309 causing a frequency shift at carrier terminal 131 and a corresponding marking signal to be transmitted over carrier line 137 to the New York regional center 100.

In a similar manner, trunk load detector 130 is connected over conductor 305 to outgoing trunk circuits 200 and 201 in trunk group 124. In each of the outgoing trunk circuits in trunk group 124 there is a 2S– supervisory relay which is operated when the trunk is busy to extend ground through a resistor and over conductor 305 to the grid circuit of a detector tube in trunk load detector 130. Trunk load detector 130 is set to operate when the level of traffic on trunk group 124 is such that if additional traffic overflowing from a remote area were to be routed via this trunk group, the trunk group would become congested and unable to handle its normal traffic. When trunk load detector 130 is triggered relay 30ST therein is operated to close send loop 310 and thus cause a frequency shift at carrier terminal 132 resulting in the transmission of a marking signal over carrier line 137 to carrier terminal 134 at the New York regional center.

At the New York regional center carrier terminals 133 and 134 respond to the marking signals transmitted from terminals 131 and 132 in the Denver regional center thereby operating relays 60RC and 60RT, respectively.

Turning now to FIG. 5 there is shown trunk load detector circuit 136 in block diagram form. Trunk load detector circuit 136 is coupled over conductor 532 to trunk circuits, such as 530 and 531, in trunk group 120 between New York and Denver. Trunk load detector 136 is set to operate when the level of traffic on trunk group 120 is such that additional calls overflowing from another route cannot be routed via trunk group 120 without adversely affecting traffic on this route. When trunk load detector 136 operates it completes a circuit for operating relay 5GBA0, and in accordance with another aspect of our invention, relays 60RC, 60RT and 5GBA0 in cooperation with other control equipment at the New York regional center actuate the alternate routing control circuit 129 depicted in FIGS. 7 and 8.

The alternate routing control arrangement depicted in FIGS. 7 and 8 comprises a plurality of circuits for altering the various routing patterns at the New York regional center and, in addition, a plurality of circuits for directing selective portions of the traffic over the altered routes.

FIG. 8 shows the regional center selection switch 8RCS and several 8RC– relays each associated with a particular remote regional center through which traffic may be routed. By rotating switch 8RCS to its various positions traffic destined for a particular regional center can be routed via one of many remote regional centers. For example, if switch 8RCS is in position 2 (as shown) a circuit is partially completed for operating relay 8RC02 which is associated with the Denver regional center 103. Similarly, switch 8RCS in position 3 can cause traffic normally destined for Atlanta to be routed via the Los Angeles regional center 104 through the operation of relay 8RC03.

In addition to switching calls via different regional centers, the alternate routing control arrangement is also capable of controlling the quantity of traffic to be routed via these remote facilities. Also shown in FIG. 8 is decoder selector switch 8DS which in its various positions prepares the operating circuits for relays 8A–, 8B–, 8C–, etc. in various combinations, and it will be shown subsequently how the 8A–, 8B–, 8C–, etc. relays function to alter the routing patterns of different quantities of decoder circuits at New York.

Returning now to the description of a call from customer 111 served by the Buffalo local office 106 to customer 112 at the Miami local office 110, let it be assumed that the call has progressed through local office 106 to the New York regional center and that decoder 0 and marker 509 thereat have tested all trunks in the direct trunk group 122 to Miami, all trunks in the first choice alternate trunk group 117 switching via Jacksonville and all trunks in the final trunk group 118 interconnected to Miami via Atlanta, and let it also be assumed that there are no idle trunks in these groups. Under this assumption decoder 0 will have received an all-trunks-busy indication from marker 509 and decoder 0 would have route advanced twice resulting in the operation of relay 6RAV'1.

In accordance with the priorly described call, the decoder at New York regional center would normally route customer 111 to an overflow tone trunk since no trunks were available in the normally designated routes. However, in the call being described at present it will be assumed that the remote network facilities via the Denver regional center are experiencing very little traffic and that these facilities can be made available to accept calls overflowing from other switching centers. Under a normal switching load there are an insufficient number of 3ST– and 3NX– relays operated at Denver to trigger tube 3DT in switching load detector 135, and relay 30SC will be released opening its contacts which interrupt send loop 309. When send loop 309 is interrupted, carrier terminal 131 transmits a "spacing" signal over carrier line 137 to terminal 133 at New York, opening receive loop 603 and releasing relay 60RC.

Let it also be assumed that the trunk group 124 between the Denver regional center 103 and the Atlanta regional center 102 is experiencing normal traffic and can handle additional calls overflowing from other routes. Under the latter assumption trunk load detector 130 is released, and relay 30ST therein is not operated thus opening send loop 310 and transmitting a "spacing" signal from carrier terminal 132 to carrier terminal 134 at New York. At carrier terminal 134 receive loop 604 is opened, releasing relay 60RT.

Turning now to FIG. 5, there is shown trunk load detector 136 connected to trunk 530 and 531 in trunk group 120 between the New York and Denver regional centers. While trunk group 120 is normally not used for completing calls between New York and Miami, the trunk load detector 136 monitors the traffic load on this trunk group to ascertain if additional traffic, overflowing from other routes, can be routed over idle trunks in trunk group 120. For the call being described, let it be assumed that there is sufficient spare trunk capacity in trunk group 120 and that this is indicated by the released relay 5GBA0 which is controlled by trunk load detector 136.

Thus at this point in a call the New York regional center switching equipment is informed of the network conditions making it possible to actuate the alternate routing control circuit and reroute traffic via the remote network facilities. In summary, the released 60RC and 60RT relays at New York indicate that the Denver switching equipment and the remote Denver to Atlanta trunk group 124, respectively, can accept traffic overflowing from other routes. In addition, the released 5GBA0 relay indicates that sufficient trunks are available between New York and Denver although these trunks are normally not tested on calls to Miami, and relay 5GBA1 is in the released condition indicating no trunks are available in the New York to Atlanta final trunk group 118.

If it is desirable to route calls via the remote facilities, start key 7STA is operated, and under the assumed conditions, a circuit is completed for operating relay 7CT0 to actuate the alternate routing control equipment. This circuit can be traced from battery through the winding of relay 7CT0, through operated contacts of relays 60RT and 60RC, through normal contacts of relay 5GBA1, through normal contacts of relay 5GBA0 and through contacts of key 7STA to ground. With relay 7CT0 operated a circuit is completed from battery through the winding of relay 7ST0, through operated contacts of relay 7CT0 and through normal contacts of relays 8RC04, 8RC03, 8RC02, and 8RC01 to ground. Relay 7ST0 operates over this circuit and locks to its own contacts over an obvious path.

With relays 7ST0 and 7CT0 operated a circuit is closed for operating one of the regional center selection relays (8RC–) in accordance with the setting of regional center selector switch 8RCS. Since the calls from New York to Miami in the example being described are to be routed via the Denver regional center, regional center selector switch 8RCS is in position 2, and a circuit is completed from ground through operated contacts of relay 7ST0, over switch wiper 806 to terminal 2, over conductor 805, through operated contacts of relay 7CT0 and through the winding relay 8RC02 (associated with the Denver regional center) to battery, operating relay 8RC02.

Having operated the regional center selection relay associated with Denver, a circuit is now completed for operating relays to alter the routing instructions in one or more of the decoders at New York. The number of decoders which will have their routing instructions altered is determined by the setting of decoder selector switch 8DS and will be described subsequently.

Returning now to FIG. 7 it will be noted that the ground extended over conductor 704 from decoder 0 is returned to decoder 0 over one of the conductors 710–713 depending on the operated and released condition of relays 8A0, 8B0, and 8C0. Decoders 1 and 2 are controlled in the same manner by similar relays 8A1, 8B1, and 8C1. More specifically, when the 8A–, 8B–, and 8C– relays are all released each decoder is programmed to route calls which are destined for Miami to overflow tone trunks if all trunks in normally designated routes to Miami are unavailable. This is accomplished by extending the ground over conductor 710 and operating route relay 6RR(OVFL) in the decoder as previously described. On the other hand, if the 8B– relays are operated the routing program in the decoders is altered so that calls overflowing from the normally designated routes to Miami are now routed via remote Denver network facilities instead of routing these calls to overflow Similarly, the operation of the 8A– or 8C– relays would route these same calls via remote facilities at Chicago or Los Angeles respectively.

The 8A–, 8B–, and 8C– relays are operated in various combinations as determined by the position of decoder selector switch 8DS in FIG. 8. When switch 8DS is in position 1 as shown, relay 8B0 is operated over a circuit traced from ground, through contacts of relay 7ST0, over wiper 807 of switch 8DS, over conductor 808, through operated contacts of relay 7CT0, through the contacts of relay 8RC02 and through the winding of relay 8B0 to battery, thus transferring in decoder 0 the routing from overflow to Denver for calls unable to complete over the normally designated routes to Miami. When decoder selection switch 8DS is in position 2 and relay 8RC02 is operated, relay 8B1 operates to alter the routing program for decoders 1 and 2 in the same manner. Further, when the decoder selection switch is in position 3 both relays 8B0 and 8B1 operate to effect the routing change in decoders 0, 1 and 2.

Thus, by rotating switch 8DS to one of its positions the routing programs of different numbers of decoders can be altered to select the quantity of traffic which is to be routed via the remote network facilities selected.

For the call being described it has been assumed that switch 8DS is in position 1 so that only relay 8B0 is operated to alter the routing program for decoder 0. With relay 8B0 operated a circuit is completed for operating route relay 6RR103 associated with the trunk group 120 to Denver. This circuit can be traced from ground in FIG. 6, through operated contacts of relay 6RAV'1, operated contacts of relay 6ATB, contacts of route relay 6RR102 in decoder 0, over conductor 704 to FIG. 7, over cross connection 703, over conductor 702, through normal contacts of relay 8A0 and through operated contacts of relay 8B0, back over conductor 712 to FIG. 6 and through the winding of route relay 6RR103 to battery operating that relay. The marker at the New York regional center now proceeds to select an idle trunk from trunk group 120 and forwards the call to Miami via the Denver regional center in the same manner as calls that were forwarded via Atlanta when trunks were available in the normally designated routes.

Other decoders such as decoders 1 and 2 which do not have their routing instructions altered by the 8A–, 8B– and 8C– relays will continue to route to overflow those calls which exceed the capacity of the normally designated routes to Miami.

The routing instructions of decoder 0 will remain in their altered state until the normally designated trunks to Miami are no longer congested or until traffic over the remote network facilities at Denver exceeds a prescribed amount whereby customer service therein is adversely affected. For instance, if trunks in the direct route to Miami comprising trunk group 122 or trunks in either of the alternate routes to Miami comprising trunk groups 117 or 118 become available, calls to Miami will once again be routed over these facilities in preference to routing via the longer remote facilities at Denver.

On the other hand, if the Miami traffic which is rerouted via the Denver network facilities begins to overburden these remote facilities, the remote facilities will no longer be made available for New York to Miami traffic. By way of illustration suppose the switching equipment at Denver begins to receive so many rerouted calls that calls normally served by this equipment are not being efficiently handled. To forestall the possibility of overloading at Denver the trigger circuit in switching load detector 135 would operate as described above, and relay 30SC would operate causing carrier terminal 131 at Denver to transmit a "marking" signal to carrier terminal 133 at the New York regional center. At carrier terminal 133 in New York the "marking" signal would cause relay 60RC to operate and relay 60RC in operating opens the operating circuit for relay 7CT0 in FIG. 7 of the alternating routing control circuit. Relay 7CT0 releases thereby releasing relays 7ST0, 8RC02, and 8B0 restoring the decoder routing instructions and the alternate routing traffic control circuit to normal.

Similarly, if traffic on the trunk group 124 between Denver and Atlanta or the trunk group 120 between New York and Denver exceeds a prescribed amount, the routing instructions of decoders at New York will be restored to normal under control of the 60RT and 5GBA0 relays, respectively. Calls in excess of the normally designated facilities for Miami will be routed to overflow in the regular manner thus reserving the remote Denver facilities for the traffic which they normally serve.

While the arrangement described herein permits traffic overflowing from regular facilities between two offices to be routed via a single remote network, it will be obvious to those skilled in the art that overflow traffic can be rerouted via other remote facilities or via several different remote facilities depending on the availability of these facilites.

In addition, the traffic control circuit can be arranged to alter many routing patterns or to alter routing patterns for different decoders in many different ways. For example, if key 7STB is operated, certain GBA–, 0RT– and 0RC– relays would be effective to operate relays 7CT1 and 7ST1 in FIG. 7. These relays would, in turn, operate one of the regional center selection relays 8RC05–8RC07 causing various combinations of relays 8A2–8C2 and 8A3 to 8C3 to operate. The operation of the latter relays (8A2, 8A3, etc.) causes the routing pattern in various decoders to be altered accordingly so that calls from New York normally routed via Chicago, for example, might now be routed via Denver or Los Angeles instead of to overflow.

Furthermore, it should be realized that the amount of traffic to be rerouted over remote facilities can be selectively altered as shown in FIG. 8 so as not to overburden the remote facilties and degrade customer service therein.

It is to be understood that the above-described arrangements are merely illustrative of the application of the principles of the invention. Numerous other arrangements may be devised by those skilled in the art without departing from the spirit and scope of the invention.

What is claimed is:

1. In a communication system for governing the extension of certain connections over normally inaccessible elongated routes, a plurality of offices; a first switching network comprising a first switching center, regular trunks to a calling one of said offices and to a called one of said offices, and switching means at said first center for interconnecting said regular trunks; a second switching network comprising a second switching center coupled to said first center, other trunks originating at said second center for interconnecting only offices other than said calling office with said called office, and switching means at said second center for establishing communication paths to said other trunks; detecting means at said second center actuated when a predetermined number of said other trunks are unoccupied; and means at said first center responsive to said actuated detecting means for rendering said other trunks available to said first center for interconnection between said calling and called offices.

2. In a communication system for governing the extension of certain connections over normally inaccessible routes, a plurality of offices; a first switching network comprising a first switching center, regular trunks to a calling one of said offices and a called one of said offices, and switching means at said first center for establishing communication paths between said regular trunks; a remote switching network comprising a remote switching center coupled to said first center, remote trunks originating at said remote center only for interconnecting offices other than said calling office with said called office and switching means at said remote center for establishing communication paths to said remote center trunks; means for determining the availability of said remote center trunks and the availability of said remote switching means; and means at said first center responsive to said determining means and effective when said regular trunks are unavailable for automatically rendering said remote center switching means and trunks available for interconnecting said calling and called offices.

3. In a communication system, a plurality of offices; a first switching network comprising a first switching center, regular trunks to a calling one of said offices and to a called one of said offices, and switching means at said first center for establishing communication paths between said regular trunks; a remote switching network comprising a remote switching center coupled to said first center, remote trunks originating at said remote center only for interconnecting offices other than said calling office with said called office, and switching means at said remote center for establishing communication paths to said remote center trunks; first means at said first center for detecting the unavailability of said regular trunks to said called office; second means at said remote center for detecting the availability of said remote trunks and the availability of said remote center switching means; and means at said first center jointly responsive to said first and second detecting means for rendering said remote trunks available for connection between said calling and called offices.

4. In a communication system, a plurality of offices; a first switching network comprising a first switching center, regular trunks to a calling one of said offices and to a called one of said offices, and switching means at said first center for establishing connections between said regular trunks; a remote switching network comprising a remote switching center coupled to said first center, remote trunks originating at said remote center only for interconnecting offices other than said calling office with said called office, and switching means at said remote center for establishing communication paths to said remote center trunks; detecting means at said first center operative in response to the unavailability of said regular trunks to said called office; means at said remote center for transmitting a signal to said first center in accordance with the availability of said remote center trunks and the availability of said remote center switching means; and means at said first center responsive to said signal when said detecting means is operated for rendering said remote trunks available for connection between said calling and called offices.

5. In a communication system, a plurality of offices; a first switching network comprising a first switching center, regular trunks to a calling one of said offices and to a called one of said offices, and switching means for interconnecting said regular trunks; a second switching network comprising a second switching center, means coupling said second center with said first center, other trunks for interconnecting offices other than said calling office with said called office, and switching means at said second center for establishing connections to said other trunks; detecting means at said first center actuated in response to the unavailability of said called office regular trunks and the availability of said coupling means; first signaling means at said remote center for transmitting a first signal to said first center in accordance with the availability of said other trunks; second signaling means at said remote center for transmitting a second signal to said first center in accordance with the availability of said second center switching means; and means at said first center responsive to the receipt of both said signals when said detecting means is actuated for rendering said other trunks available to said first center for interconnecting said calling office over said other trunks to said called office.

6. In a communication system for controlling the extension of certain connections over normally inaccessible routes, a plurality of offices; a first switching network comprising a switching center, regular trunks to a calling one of said offices and to a called one of said offices, and a plurality of first switching means at said first center each effective for controlling connections between said regular trunks; a remote switching network available for interconnecting other of said offices with said called office and unavailable for interconnecting said calling and called offices, said remote network comprising a remote switching center, other trunks from said first center and from said called office, and switching means at said remote center for interconnecting said other trunks; means at said first center for detecting the unavailability of said called office regular trunks and the availability of a predetermined number of other trunks from said first center to said remote center; means at said remote center for detecting the availability of said remote switching means and the availability of a predetermined number of said other called office trunks; and control means at said first center jointly responsive to said first and second detecting means for rendering said remote network available to said first center switching means for interconnecting said calling and called offices.

7. The invention defined in claim 6 wherein said control means comprises means for rendering said remote network available to a predetermined portion of said first switching means.

8. The invention defined in claim 7 wherein said control means further comprises means for selectively altering the portion of said first switching means having access to said remote network independently of said first and second detecting means.

9. In a telephone system, a plurality of offices; a first switching network comprising a first switching office, regular trunks to a calling one of said offices and to a called one of said offices, and switching means for interconnecting trunks at said first office; a second switching network comprising a second switching office, trunks incoming to said second switching office from other of said offices, trunks outgoing from said second switching office to said called office, and control means responsive to service request signals over said incoming trunks for interconnecting said incoming and outgoing trunks; other trunks coupling said switching offices for interconnecting said calling office with said other offices and unavailable to said switching means for interconnecting said calling and called offices; means at said second office for transmitting a switching load signal to said first office in accordance with the number of incoming trunks requesting service by said control means; means at said second office for transmitting a trunk load signal to said first office in accordance with the number of said outgoing trunks occupied; and trunk selecting means at said first office responsive to said load signals and effective when said regular called office trunks are occupied for rendering said other trunks available to said switching means for interconnecting said calling and called offices.

10. The invention defined in claim 9 wherein said switching load signaling means comprises means for transmitting a first switching load signal in response to a predetermined number of said incoming trunks requesting service and means for transmitting a second switching load signal when less than said predetermined number of incoming trunks are requesting service, wherein said trunk load signaling means comprises means for transmitting a first trunk load signal in response to a predetermined number of said outgoing trunks being occupied and a second trunk load signal in response to less than said predetermined number of outgoing trunks being occupied, and wherein said first office trunk selecting means comprises means for rendering said other trunks available for interconnection between said calling and called offices only upon receipt of both said second load signals.

11. The invention defined in claim 10 wherein said first office switching means comprises a plurality of individual means for interconnecting trunks thereat and wherein said trunk selecting means comprises means for rendering said other trunks available to selective portions of said switching means.

12. The invention defined in claim 10 wherein said first office includes detecting means independent of said switching means and actuated when a predetermined number of said other trunks are idle and wherein said first office trunk selecting means comprises means for rendering said other trunks available for interconnection between said calling and called offices only upon receipt of both said second load signals when said other trunk detecting means is actuated.

13. The invention defined in claim 12 wherein said second office control means comprises a plurality of sender means and a plurality of relay means each responsive to one of said incoming trunks requesting service by one of said sender means, wherein said switching load signaling means comprises a first trigger circuit responsive to different numbers of said relay means being operated for transmitting said switching load signals, wherein each said outgoing trunk includes trunk relay means operated when said trunk is occupied, and wherein said trunk load signaling means comprises a second trigger circuit responsive to different numbers of said trunk relay means being operated for transmitting said trunk load signals.

References Cited

UNITED STATES PATENTS

| | | | |
|---|---|---|---|
| 2,476,888 | 7/1949 | Mitchell | 179—27 |
| 2,265,235 | 12/1941 | Keyser et al. | 179—18 |
| 3,309,467 | 3/1967 | Gorgas et al. | 179—18 |

FOREIGN PATENTS

| | | |
|---|---|---|
| 646,374 | 11/1950 | Great Britain. |

WILLIAM C. COOPER, *Primary Examiner.*